United States Patent
Zheng

(10) Patent No.: US 11,258,705 B2
(45) Date of Patent: Feb. 22, 2022

(54) METHOD, APPARATUS, AND SYSTEM FOR MANAGING LABEL OF ACCESS NETWORK

(71) Applicant: Huawei Technologies Co., Ltd., Shenzhen (CN)

(72) Inventor: Ruobin Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 574 days.

(21) Appl. No.: 15/724,826

(22) Filed: Oct. 4, 2017

(65) Prior Publication Data

US 2018/0026886 A1 Jan. 25, 2018

Related U.S. Application Data

(63) Continuation of application No. 13/337,814, filed on Dec. 27, 2011, now Pat. No. 9,800,498, which is a (Continued)

(30) Foreign Application Priority Data

Jun. 24, 2009 (CN) .......................... 200910108525.6

(51) Int. Cl.
*H04W 40/00* (2009.01)
*H04L 45/00* (2022.01)
(Continued)

(52) U.S. Cl.
CPC ......... *H04L 45/68* (2013.01); *H04Q 11/0067* (2013.01); *H04L 29/12037* (2013.01); *H04L 61/106* (2013.01); *H04Q 2011/0079* (2013.01)

(58) Field of Classification Search
CPC ....... H04Q 11/0067; H04Q 2011/0088; H04Q 2011/0064; H04Q 2011/0077;
(Continued)

(56) References Cited

U.S. PATENT DOCUMENTS 8,073,330 B2 * 12/2011 Zheng ................. H04L 12/2881
398/100
8,160,447 B2 4/2012 Tsuge et al.
(Continued)

FOREIGN PATENT DOCUMENTS

CN 101047636 A 10/2007
CN 100373799 C 3/2008
(Continued)

OTHER PUBLICATIONS

Bryant et al. "PWE3 Architecture," Pseudo-Wire Edge-to-Edge (PWE3) Working Group, Internet draft, Document: <draft-ietf-pwe3-arch-07.txt>, XP015025952, pp. 1-44, Internet Engineering Task Force, Reston, Virginia (Mar. 2003).
(Continued)

*Primary Examiner* — Tanya T Motsinger
(74) *Attorney, Agent, or Firm* — James Anderson Harrison

(57) ABSTRACT

The present invention relates to the field of network communications. An Optical Line Terminal (OLT) allocates a Pseudo Wire (PW) label of an access segment PW for a port, and establishes a corresponding relationship between the port information and the PW label; and carries the corresponding relationship between the port information and the PW label in a label management message, and sends the label management message to an Optical Network Unit (ONU) so that the ONU updates a forwarding table, in which the label management message adopts an access network management protocol. As a consequence, a problem of supporting Pseudo Wire Emulation Edge-to-Edge (PWE3) on a data plane of an access segment of an access network is solved under the conditions that device complexity of the ONU is not increased and a configuration of the ONU is slightly changed.

21 Claims, 19 Drawing Sheets

Related U.S. Application Data continuation of application No. PCT/CN2010/000929, filed on Jun. 24, 2010.

(51) Int. Cl.
*H04Q 11/00* (2006.01)
*H04L 61/106* (2022.01)

(58) Field of Classification Search
CPC ..... H04L 45/50; H04L 45/68; H04L 12/2874; H04L 12/4633; H04L 2212/00; H04L 45/507; H04L 47/825
See application file for complete search history.

(56) References Cited

U.S. PATENT DOCUMENTS

| | | | |
|---|---|---|---|
| 8,160,448 B2 | 4/2012 | Tsuge et al. | |
| 2004/0240439 A1* | 12/2004 | Castleberry | H04L 29/06027 370/389 |
| 2006/0120723 A1* | 6/2006 | Diouf | H04L 12/5601 398/71 |
| 2007/0025734 A1* | 2/2007 | Oogushi | H04J 14/02 398/71 |
| 2007/0140288 A1 | 6/2007 | Boyd et al. | |
| 2007/0264017 A1* | 11/2007 | Mizutani | H04J 3/1694 398/72 |
| 2008/0056250 A1* | 3/2008 | Takase | H04L 45/021 370/389 |
| 2008/0253379 A1 | 10/2008 | Sasagawa | |
| 2008/0279567 A1* | 11/2008 | Huang | H04J 14/0227 398/168 |
| 2009/0080438 A1 | 3/2009 | Zhou et al. | |
| 2009/0169207 A1* | 7/2009 | Absillis | H04L 12/4641 398/58 |
| 2009/0208204 A1* | 8/2009 | Zhang | H04L 12/2861 398/25 |
| 2009/0274461 A1* | 11/2009 | Xu | H04L 12/2861 398/66 |
| 2010/0054264 A1 | 3/2010 | Sato | |
| 2010/0158033 A1 | 6/2010 | Miyabe | |
| 2010/0272436 A1* | 10/2010 | Mizutani | H04B 10/272 398/25 |
| 2010/0296811 A1* | 11/2010 | Ohira | H04L 1/0009 398/72 |
| 2011/0103382 A1 | 5/2011 | Kim et al. | |
| 2011/0116796 A1* | 5/2011 | Zheng | H04L 12/4633 398/45 |
| 2011/0170865 A1 | 7/2011 | Zheng | |
| 2011/0188857 A1* | 8/2011 | Zheng | H04L 12/6418 398/45 |
| 2012/0093086 A1* | 4/2012 | Yin | H04L 69/16 370/328 |
| 2013/0039182 A1* | 2/2013 | Das | H04L 41/0816 370/235 |
| 2013/0336122 A1* | 12/2013 | Baruah | H04L 45/24 370/235 |
| 2014/0043972 A1* | 2/2014 | Li | H04L 45/50 370/230 |
| 2015/0289303 A1* | 10/2015 | Zhang | H04W 76/12 370/328 |
| 2017/0064674 A1* | 3/2017 | Wang | H04L 45/745 |
| 2017/0118043 A1* | 4/2017 | Hao | H04L 12/4633 |
| 2019/0207803 A1* | 7/2019 | Kalburgi | H04L 41/0654 |

FOREIGN PATENT DOCUMENTS

| | | |
|---|---|---|
| CN | 101304390 A | 11/2008 |
| CN | 101369958 A | 2/2009 |
| WO | 2008139553 A1 | 11/2008 |
| WO | 2009037732 A1 | 3/2009 |

OTHER PUBLICATIONS

"Pseudo-or-pseudo-," http://www.credoreference.com/entry/penguineng/pseud_or_pseudo, The Penguin English Dictionary, Penguin, London, United Kingdom (Accessed Oct. 9, 2013).

Martini et al., "Pseudowire Setup and Maintenance Using the Label Distribution Protocol (LDP)," Network Working Group, Request for Comments: 4447, Category: Standards Track, RFC447, pp. 1-29, The Internet Society (Apr. 2006).

"Series G: Transmission Systems and Media, Digital Systems and Networks, Digital sections and digital line system—Optical line systems for local and access networks; Gigabit-capable Passive Optical Networks (G-PON): Transmission convergence layer specification; Amendment 1—Specification of the ONU registration method and various clarifications," ITU-T Recommendation G.984.3 Amendment 1, International Telecommunication Union, pp. 1-16, Geneva, Switzerland (Feb. 2009).

Cohen et al., "Migration to Ethernet-Based DSL Aggregation," Architecture and Transport Working Group, Technical Report, DSL Forum TR-101, pp. 1-101 (Apr. 2006).

* cited by examiner

METHOD, APPARATUS, AND SYSTEM FOR MANAGING LABEL OF ACCESS NETWORK

CROSS-REFERENCE TO RELATED APPLICATIONS

This application is a continuation of U.S. patent application Ser. No. 13/337,814, filed on Dec. 27, 2011, which is a continuation of International Application No. PCT/CN2010/000929, filed on Jun. 24, 2010. The International Application claims priority to Chinese Patent Application No. 200910108525.6, filed on Jun. 24, 2009. All of the aforementioned patent applications are hereby incorporated by reference in their entireties.

FIELD OF THE INVENTION

The present invention relates to the field of network communications, and in particular, to a method, an apparatus, and a system for managing a label of an access network.

BACKGROUND OF THE INVENTION

A Pseudo Wire (PW) is a mechanism that carries a key element of an emulated service from a Provider Edge (PE) to another one or multiple PEs through a Packet Switch Network (PSN). A variety of services are emulated through a tunnel on the PSN. The tunnel includes an Internet Protocol (IP) tunnel, a Layer 2 Tunneling Protocol (L2TP) tunnel, and a Multi-Protocol Label Switching (MPLS) tunnel. The services include an Asynchronous Transfer Mode (ATM), Time Division Multiplexing (TDM), and an Ethernet. The PSN may transmit data payloads of diversified services. An internal data service carried by the PW is invisible to a bearer network. In other words, the bearer network is transparent to a Customer Edge (CE) data stream. A local data unit (such as a bit, a cell, and a packet) arriving through an Attachment Circuit (AC) is first encapsulated into a Pseudo Wires Protocol Data Unit (PW-PDU), and then transferred through a PSN tunnel in a lower-layer bearer network. The PE executes encapsulation and decapsulation processes necessary to the PW-PDU, and any other functions (such as sorting and timing functions) required by a PW service. Currently, three optional PW outer-layer tunnel encapsulation modes exist, which are an IP/User Datagram Protocol (UDP) mode, an L2TP version 3 (L2TPv3) mode, and an MPLS mode respectively. Referring to FIG. 8, FIG. 8 is a schematic reference diagram of a network of a point-to-point PW, in which two PE devices PE 1 and PE 2 provide one or multiple PWs for CE devices CE 1 and CE 2 that are connected to the PE 1 and the PE 2, so that the corresponding CE devices may communicate with each other on the PSN.

An existing mobile bearer network based on a Passive Optical Network (PON) uses the PON to perform mobile bearing on various services from a Base Station (BS). Then, the PON is connected to a network element of a mobile network, such as a Base Station Controller (BSC) of a Second Generation (2G) mobile network, a Radio Network Controller (RNC) of a Third Generation (3G) mobile network, or an access gateway (AGW) of a Long Time Evolution (LTE) mobile network, through a metropolitan area convergence network (such as a PSN).

An operator hopes that an MPLS-based Pseudo Wire Emulation Edge-to-Edge (PWE3) network is completely adopted end-to-end from a PON access segment to the metropolitan area convergence network, so as to provide an end-to-end guarantee for Quality of Service (QoS) of TDM/ATM bearing.

An Optical Network Unit (ONU) and an Optical Line Terminal (OLT) are mass access devices, and are usually Layer 2 devices. However, in order to support the PWE3 at the PON access segment, all ONUs and OLTs are required to upgrade a control plane to Layer 3, and support a routing protocol, for example, a Routing Information Protocol (RIP), an MPLS Label Distribution Protocol (LDP), for example, LDP and a Resource Reservation Protocol (RSVP), and PW LDP, for example, a targeted LDP (T-LDP) or a Border Gateway Protocol (BGP), which causes high complexity and poor scalability to the ONUs and the OLTs. Therefore, a technology that supports the PWE3 on a data plane of the PON access segment under the conditions that the device complexity of an ONU is not increased and a configuration of the ONU needs only to be slightly changed is required.

SUMMARY OF THE INVENTION

An objective of embodiments of the present invention is to provide a method, an apparatus, and a system for managing a label of an access network, so as to solve a problem of supporting PWE3 on a data plane of an access segment of the access network under the conditions that complexity of an access device is not increased and a configuration of the access device needs only to be slightly changed.

The objective of the embodiments of the present invention is achieved through the following technical solutions:

A method for managing a label of an access network includes:

allocating, by an OLT, a PW label of an access segment PW for a port, and establishing a corresponding relationship between the port information of the port and the PW label; and carrying the corresponding relationship between the port information of the port and the PW label in a label management message, and sending the label management message to an ONU so that the ONU updates a forwarding table according to the corresponding relationship, in which the label management message adopts an access network management protocol, and the access network management protocol is an Optical Network Terminal, ONT, Management and Control Interface, OMCI, protocol.

An ONU includes:

a receiving unit, configured to receive a label management message from an OLT, in which the label management message adopts an access network management protocol, and the label management message carries a corresponding relationship between port information of a port and an MPLS label, or a corresponding relationship between the port information of the port and a PW label, or a corresponding relationship between an MPLS tunnel ID of an MPLS tunnel and the MPLS label; and an update unit, configured to update a forwarding table according to the corresponding relationship.

An Optical Line Terminal (OLT) includes:

a first management unit, configured to allocate a PW label of an access segment PW for a port, and establish a corresponding relationship between the port information of the port and the PW label; and a first sending unit, configured to carry the corresponding relationship between the port information of the port and the PW label in a label management message, and send the label management message to an ONU, so that the ONU updates a forwarding table according to the corresponding relationship, in which the label management message adopts an access network management protocol.

An access system of an access network includes an OLT and at least one ONU, where:

the OLT is configured to allocate a PW label of an access segment PW for a port, establish a corresponding relationship between the port information of the port and the PW label, carry the corresponding relationship between port information of the port and the PW label in a label management message, and send the label management message to the ONU, where the label management message adopts an access network management protocol, and the access network management protocol is an Optical Network Terminal, ONT, Management and Control Interface, OMCI, protocol; and the ONU is configured to receive the label management message from the OLT, and update a forwarding table according to the corresponding relationship.

In the technical solutions according to the embodiments, a message of the access network management protocol is used to carry a label, so the problem of supporting the PWE3 on the data plane of the access segment of the access network under the conditions that the device complexity of the access device is not increased and the configuration of the access device needs only to be slightly changed.

BRIEF DESCRIPTION OF THE DRAWINGS

To make the technical solutions according to the embodiments of the present invention or in the prior art more comprehensible, the accompanying drawings that need to be used in the descriptions of the embodiments or the prior art are briefly described below. Apparently, the accompanying drawings described below merely demonstrate some of the embodiments of the present invention. Based on the accompanying drawings, persons of ordinary skill in the art may obtain other accompanying drawings without making creative efforts.

DETAILED DESCRIPTION OF THE EMBODIMENTS

According to embodiments of the present invention, an access network may adopt a non-routing protocol, for example, existing configuration protocols of the access network are adopted to perform label management (for example, allocation, modification, or deletion of a label), so as to implement management (for example, establishment, modification, or deletion of the LSP or the PW) on an MPLS Label Switch Path (LSP) or a PW of the access network. In the embodiments of the present invention, these existing configuration protocols of the access network are called access network management protocols. For example, in the embodiments of the present invention, the access network may be a PON, which adopts a point-to-multipoint access network technology. The access network may also adopt a point-to-point access technology, for example, point-to-point Ethernet access or point-to-point Digital Subscriber Line (DSL) access.

In the embodiments of the present invention, a mobile bearer network or a packet bearer network is divided into an access segment and a core segment, in which a part from a user-side PE device to an S-PE is the access segment, and a part from the S-PE to a PE device that is connected to an RNC and on the other side or to a network-side PE device is the core segment. When the access segment adopts PON access, the user-side PE device may be an ONU; when the access segment adopts Ethernet access, the user-side PE device may be an Ethernet switch, router, or a terminal device with an Ethernet port; and when the access segment adopts DSL access, the user-side PE device herein may be a DSL modem. A location of an OLT is equivalent to that of a Digital Subscriber Line Access Multiplexer (DSLAM). The access segment being a PON is taken as an example in the following embodiments, which is similar to a case in which the access segment is an Ethernet or a DSL.

An embodiment of the present invention is described below with reference to FIGS. 1 to 7.

Figure 1:
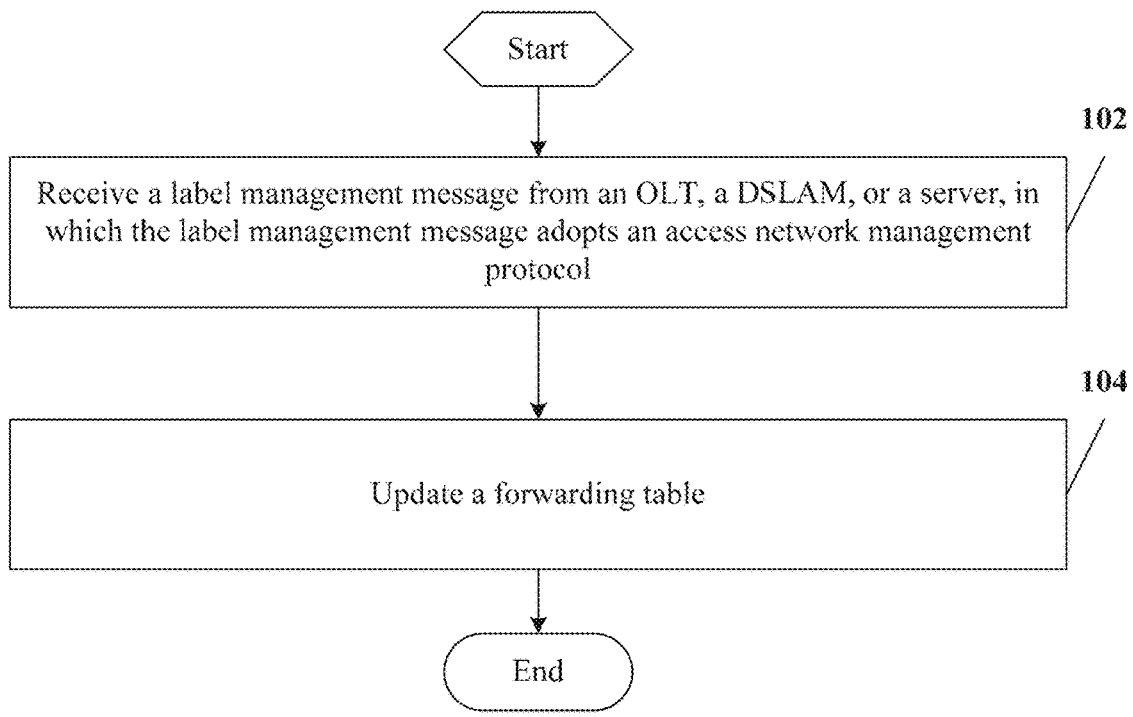
FIG. 1 is a flow chart of a method for managing a label of an access network according to an embodiment of the present invention.

FIG. 1 is a flow chart of a method for managing a label of an access network according to an embodiment of the present invention. The method includes:

Step 102: A user-side PE device receives a label management message from an OLT, a DSLAM, or a second server, so as to allocate, modify, or delete a corresponding label, in which the label management message adopts an access network management protocol, and the label management message carries a corresponding relationship between port information of a port and an MPLS label, or a corresponding relationship between the port information of the port and a PW label, or a corresponding relationship between an MPLS tunnel ID of an MPLS tunnel and the MPLS label.

For example, the user-side PE device may be an ONU. The ONU receives the label management message from the OLT or the second server. The message may be sent by the second server, or sent by the OLT that is used as an S-PE device, or forwarded to the ONU directly or after being processed correspondingly after the OLT that is used as a Provider (P) device receives the label management message sent by an IP edge node, a Broadband Network Gateway (BNG), or a metropolitan area convergence node that is used as the S-PE device. The label management message adopts the access network management protocol. The access network management protocol may be an Optical Network Terminal (ONT) Management and Control Interface (OMCI) protocol, an Ethernet Operations, Administration and Maintenance (Ethernet OAM) protocol, a Layer 2 Control Protocol (L2CP), a TR096 protocol, a Simple Network Management Protocol (SNMP), a Remote Authentication Dial In User Service (RADIUS) protocol, or a Diameter protocol. The L2CP is also called an Access Node Control Protocol (ANCP), and is a protocol adopted by a Layer 2 Control Mechanism (L2CM). The RADIUS and Diameter protocols may also be collectively called an Authentication, Authorization, Accounting (AAA) protocol.

In order to implement PWE3 at an access segment, a PW label and an MPLS label need to be allocated at the access segment. In some cases, no PW is required, and an MPLS tunnel directly carries a service, such as the ATM, ETH, and IP, and only the MPLS label needs to be allocated at this time. In some cases, the MPLS is not required, and the PW may be directly carried by a lower layer network, and only the PW label needs to be allocated at this time.

The port corresponds to an AC. For PON access, the port information includes ONU port information and/or OLT port information. For DSL access, the port information includes DSL port information. For Ethernet access, the port information includes Ethernet port information. An AC ID may be just the port information, or a logic number of the port information.

The ONU port information/DSL port information may be an access loop identifier or a circuit ID. For example, when an ONU port is an ATM-based DSL, the ONU port information may be ONUID atm slot2/port2:vpi.vci, and when the ONU port is an Ethernet-based DSL, the ONU port information may be ONUID eth slot2/port2[:vlan-id], in which ONUID is an ONU ID, slot2/port2 is one of or any combination of a chassis number, a rack number, a frame number, a slot number, a sub-slot number, and a port number on the ONU, vpi.vci is a Virtual Path Identifier (VPI) and a Virtual Channel Identifier (VCI) on the DSL, and VLAN ID is a Virtual Local Area Network (VLAN) identifier.

The OLT port information may be Access-Node-Identifier slot1/port1[:vlan-id], in which Access-Node-Identifier is an ID of the OLT, slot1/port1 is one of or any combination of a chassis number, a rack number, a frame number, a slot number, a sub-slot number, and a port number on the OLT, and VLAN ID is a VLAN identifier.

The ONU port/DSL port/Ethernet port may also be a specified type of ATM cell, TDM timeslot, ETH frame, or IP packet. For example, the ONU port information may include an ATM VPI and VCI, a TDM timeslot number, a Media Access Control (MAC) address, a VLAN ID, an Ethernet priority, an IP address, and a Differentiated Services Code Point (DSCP).

The MPLS tunnel ID or the port is used to identify a specified MPLS tunnel. The MPLS tunnel ID may be a logic number, and may also consist of two end node addresses of the MPLS tunnel. A case in which the label management message carries the port information and the corresponding MPLS label usually occurs when the MPLS tunnel directly carries a service.

It should be understood by persons of ordinary skill in the art that the label management message may be one message or a set formed by multiple messages because the PW and the MPLS tunnel may be unidirectional or bidirectional. For example, the label management message is sent twice, and respectively carries label management information in two directions, that is, a label from the ONU to the OLT and port information or an MPLS tunnel ID corresponding to the label, and a label from the OLT to the ONU and port information or an MPLS tunnel ID corresponding to the label. In addition, the label management message may carry one label or a set of labels and one piece of or a set of port information or one MPLS tunnel ID or a set of MPLS tunnel IDs corresponding to the label or the set of labels.

Optionally, before Step 102, the method may further include sending, by the ONU, a label request message to the OLT or the second server, in which the label request message adopts an access network management protocol and the label request message carries the port information or the MPLS tunnel ID.

The label request message adopts the access network management protocol, and the access network management protocol may be the OMCI protocol, the Ethernet OAM protocol, L2CP, the TR069 protocol, or the AAA protocol.

The label request message carries the port information or the MPLS tunnel ID for which a label needs to be allocated, so that the OLT, or the S-PE device, or the second server allocates the label for the port or the MPLS tunnel, and sends the label management message. The label request message may also carry egress node information, so as to request the OLT, or the S-PE device, or the second server to allocate a label of a specified direction. For example, the egress node information being ONU indicates that a label, which is allocated by the OLT or the S-PE device, of a direction from the OLT or the S-PE device to the ONU is requested to be allocated, modified, or deleted. The label request message may also simultaneously carry the port information for which the label needs to be allocated and the egress node information, or simultaneously carry the MPLS tunnel ID and the egress node information.

The second server may be an AAA server or an Automatic Configuration Server (ACS). The second server is a label configuration server in this embodiment of the present invention, and the server may also be built in the OLT or the BNG. The S-PE device sends an access segment label request message to the server to request allocation, modification, or deletion of the label corresponding to the port. OLT port information and ONU port information in the access segment label request message may both be added by the ONU or the OLT alone, or the ONU port information and the OLT port information may be added by the ONU and the OLT respectively.

When the ACS is adopted to perform label configuration, the TR069 protocol may be adopted, and a user-side PE device/S-PE device needs to support the TR069 protocol. When an AAA server is adopted to perform the label configuration, the RADIUS/Diameter protocol may be adopted, and the user-side PE device/S-PE device needs to support the RADIUS/Diameter protocol. Alternatively, for PON access, only the OLT supports the RADIUS/Diameter protocol, the ONU supports the OMCI protocol, and the OLT performs label management message conversion between the RADIUS/Diameter protocol and the OMCI protocol. Alternatively, only the OLT supports the RADIUS/Diameter protocol, the ONU supports the Ethernet OAM protocol, and the OLT performs label management message conversion between the RADIUS/Diameter protocol and the Ethernet OAM protocol.

Access segment labels corresponding to the OLT port and the ONU port are queried and found by the second server according to the OLT port and the ONU port. The S-PE device receives the access segment label sent by the second server. An access segment label allocation message not only carries the access segment labels corresponding to the OLT port and the ONU port, but may also carry an access segment policy or a profile. The access segment policy or the profile is used to provide information about, such as, an access segment QoS policy, timing, and billing.

Step 104: Update a forwarding table according to the corresponding relationship.

In order to enable data of MPLS-based PWE3 on the data plane to be forwarded correctly, the ONU needs to update the forwarding table according to the port information of the port or the MPLS tunnel ID of the MPLS tunnel and a PW label of an access segment PW or an MPLS label that corresponds to the port or the MPLS tunnel, and add, modify, or delete a corresponding item of the corresponding PW label or MPLS label. The forwarding table includes a Forwarding Information Base (FIB).

A Forwarding Equivalence Class (FEC) defines a set of data, cells, timeslots, frames, or packets, which in terms of forwarding behavior all have the same forwarding property. In order that data entering each specified access loop, or each specified ATM cell, TDM timeslot, ETH frame, or IP packet entering a network is designated to a specified FEC, in which the FEC is a coded port (such as the ONU port and/or the OLT port) or an AC ID, the PW label or the MPLS label needs to be associated with the port according to a mapping relationship between the label and the port. Therefore, on the data plane, according to an association relationship between the PW label or the MPLS label and the port, data entering a specified port is encapsulated into a frame having the corresponding PW label or the corresponding MPLS label, or after a frame having the specified PW label or the specified MPLS label is decapsulated, data is forwarded by a corresponding port.

Figure 2:
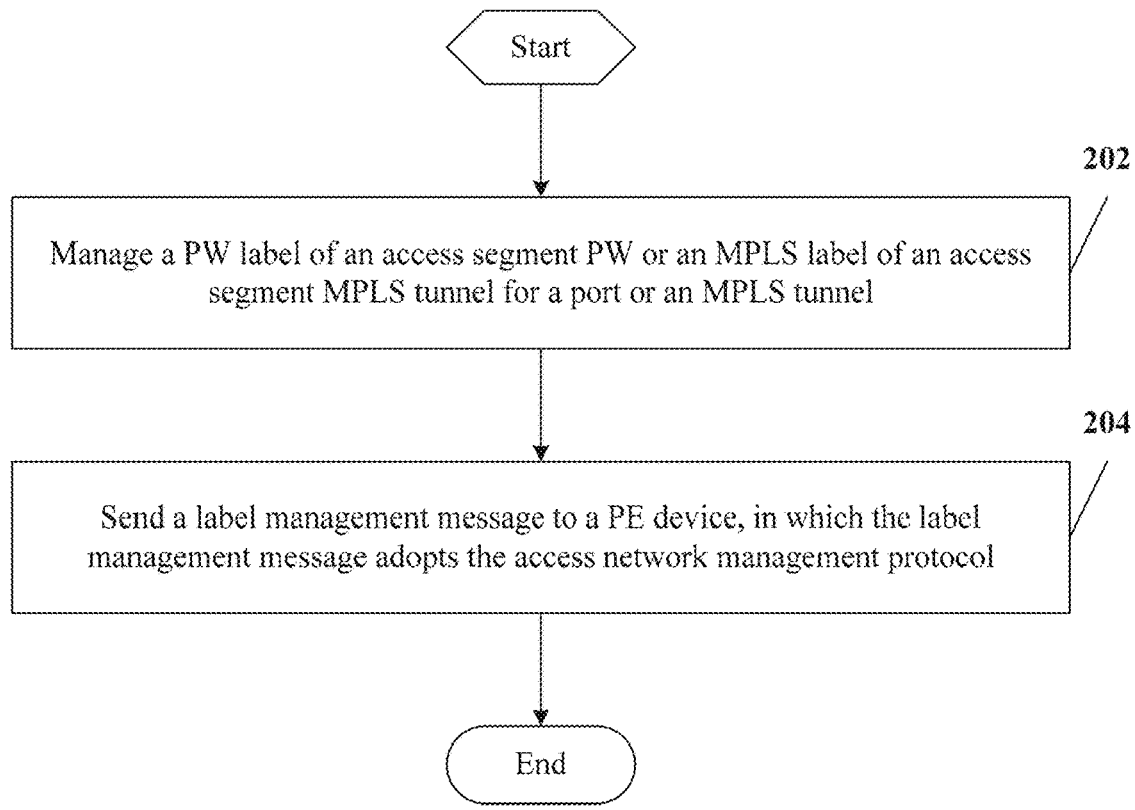
FIG. 2 is a flow chart of a method for managing a label of an access network according to an embodiment of the present invention.

FIG. 2 is a flow chart of a method for managing a label of an access network according to an embodiment of the present invention. The method includes:

Step 202: Manage a PW label of an access segment PW or an MPLS label of an access segment MPLS tunnel for a port or an MPLS tunnel, and manage a corresponding relationship between port information of the port and the MPLS label, or manage a corresponding relationship between the port information of the port and the PW label, or manage a corresponding relationship between an MPLS tunnel ID of the MPLS tunnel and the MPLS label.

An S-PE device allocates, modifies, or deletes a label for the port or the MPLS tunnel. When a label is allocated, modified, or deleted for the port, the label is the PW label of the access segment PW or the MPLS label. When a label is allocated, modified, or deleted for the MPLS tunnel, the label is the MPLS label of the MPLS tunnel. In order to implement PWE3 at the access segment, the PW label and the MPLS label need to be allocated, modified, or deleted at the access segment. In some cases, for example, when the MPLS tunnel directly carries a service, only the MPLS label needs to be allocated, modified, or deleted for the port. In some cases, the MPLS is not required, and the PW may be directly carried by a lower layer network, and only the PW label needs to be allocated, modified, or deleted for the port at this time.

The S-PE device may be an OLT, and may also be an IP edge node, a BNG, or a metropolitan area convergence node.

When the S-PE device is the IP edge node, the BNG, or the metropolitan area convergence node and when the MPLS label is allocated, modified, or deleted for the MPLS tunnel ID, MPLS labels between the S-PE device and the OLT and between the OLT and an ONU may be allocated, modified, or deleted at the same time, or only the MPLS label between the S-PE device and the OLT is allocated, modified, or deleted, and the OLT allocates, modifies, or deletes the MPLS label between the OLT and the ONU.

Optionally, before Step 202, the method may further include: receiving a label request, modification, or deletion message sent by the ONU, in which the label request, modification, or deletion message adopts an access network management protocol and the label request, modification, or deletion message carries the port information and/or egress node information, or the label request, modification, or deletion message carries the MPLS tunnel ID and/or the egress node information.

Optionally, before Step 202, the method may further include sending an access segment label request, modification, or deletion message to a second server, in which the access segment label request, modification, or deletion message carries port information of a port, for example, port information of an OLT port and an ONU port, so as to request for configuring an access segment label, for example, request for allocating, modifying, or deleting a label from the ONU to the OLT/a label from the OLT to the ONU for the ONU, and request for allocating, modifying, or deleting a label from the OLT to an upper-level node of the OLT/a label from the upper-level node of the OLT to the OLT for the OLT.

An access segment label management message sent by the second server is received. An access segment label allocation, modification, or deletion message carries a label corresponding to the port, for example, the label from the ONU to the OLT/the label from the OLT to the ONU that is allocated, modified, or deleted for the ONU, and the label from the OLT to the upper-level node of the OLT/the label from the upper-level node of the OLT to the OLT that is allocated, modified, or deleted for the OLT, and the label includes the PW label and/or the MPLS label. The second server may take the initiative to deliver the access segment label management message to the ONU or the OLT, or deliver the access segment label management message after receiving the access segment label request, modification, or deletion message.

Step 204: Send a label management message to a PE device, in which the label management message adopts the access network management protocol, the label management message carries the corresponding relationship, and the label management message enables the ONU to update a forwarding table and add, modify, or delete a corresponding label item according to the corresponding relationship.

The PE device herein is usually a PE device deployed on a user side. For example, the user-side PE device may be an ONU. When the S-PE device is an OLT, the access network management protocol includes an OMCI protocol, an Ethernet OAM protocol, L2CP, a TR069 protocol, or an AAA protocol.

When the S-PE device is an IP edge node, a BNG, or a metropolitan area convergence node, the S-PE device is an upper layer device of the OLT, and the label allocation, modification, or deletion message needs to be sent to the ONU through the OLT. The access network management protocol includes L2CP, the TR069 protocol, the Ethernet OAM protocol, or the AAA protocol because the S-PE device does not support the OMCI protocol. In this case, the OLT needs to forward the label allocation, modification, or deletion message to the ONU. The OLT may directly forward the message to the ONU after detecting the label allocation, modification, or deletion message, in which the ONU also needs to support L2CP, the TR069 protocol, the Ethernet OAM protocol, or the AAA protocol, and the OLT may also convert the message into a message of the OMCI protocol or the Ethernet OAM protocol after detecting the label allocation, modification, or deletion message, and then forward the converted message to the ONU. If the label allocation, modification, or deletion message carries the MPLS tunnel ID or the mapping relationship between the port and the MPLS label, the OLT updates a label switching table according to the MPLS tunnel ID or the mapping relationship between the port and the MPLS label after detecting the label allocation, modification, or deletion message. The label switching table may be a Label Forwarding Information Base (LFIB).

In order to form a complete end-to-end MPLS-based PW and/or LSP, the PW and/or the LSP needs to be established at a core segment, and a core segment label needs to be allocated. For the PW, the core segment PW and the access segment PW further need to be associated at the S-PE device; or the PW and/or the LSP further needs to be deleted at the core segment, and the core segment label further needs to be deleted. For the PW, the core segment PW and the access segment PW further need to be associated or disassociated at the S-PE device.

It should be understood by persons of ordinary skill in the art that the allocation of the core segment label and the allocation, modification, or deletion of the access segment label are basically independent of each other, which therefore may be performed before or after Steps 202 and 204.

A method for forming the complete end-to-end MPLS-based PW and/or LSP is described below by taking a PON as an example.

Figure 3:
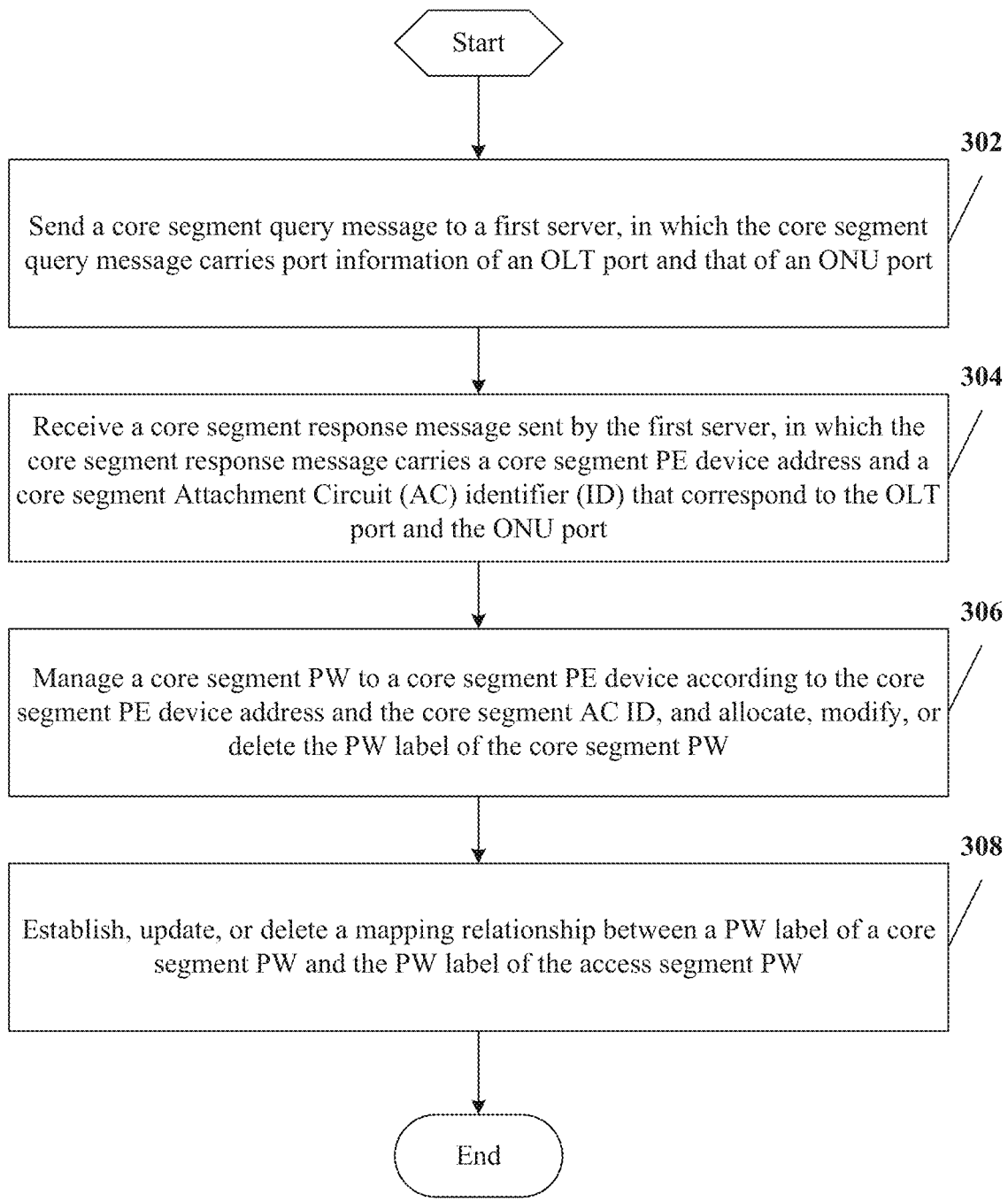
FIG. 3 is a flow chart of a corresponding method for managing a network core segment label when a PW label is allocated, modified, or deleted for a port according to an embodiment of the present invention.

Referring to FIG. 3, FIG. 3 is a flow chart of a corresponding method for managing a network core segment label when a PW label is allocated, modified, or deleted for a port according to an embodiment of the present invention. The method includes:

Step 302: Send a core segment query message to a first server, in which the core segment query message carries port information of the port.

For example, the first server may be an AAA server or a policy server. The first server is a server for querying a core segment AC ID and an egress node address in this embodiment of the present invention. An S-PE device sends the core segment query message to the server to request the core segment AC ID and the egress node address. For example, in the PON, the query message carries the port information of an OLT port and that of an ONU port. The port information of the OLT port and that of the ONU port in the query message may both be added by an ONU or an OLT alone, or the port information of the ONU port and that of the OLT port may be added by the ONU and the OLT respectively.

Step 304: Receive a core segment response message sent by the first server, in which the core segment response message carries a core segment PE device address and a core segment AC ID that correspond to the port.

The core segment PE device address and the core segment AC ID that correspond to the OLT port and the ONU port are queried and found according to the port information of the OLT port and that of the ONU port. The S-PE device receives the core segment response message sent by the first server. The core segment response message carries the core segment PE device address and the core segment AC ID. The core segment response message may further carry a policy or a profile, and the policy or the profile is used to provide information about, such as, a QoS policy, timing, and billing.

PWs or LSPs in different directions have their respective core segment AC IDs, so the core segment response message shall include core segment AC IDs in two directions; or the core segment response message is sent twice, and carries a core segment AC ID of one direction each time. No matter which scheme is adopted, a direction of the PW or the LSP to which each of the two AC IDs corresponds needs to be indicated, and a common practice is to indicate respective corresponding egress node information of each of the two AC IDs. In order to indicate a mapping relationship between a core segment PW and an access segment PW or a mapping relationship between a core segment LSP and an access segment LSP, the corresponding OLT port and ONU port may be carried in the core segment response message.

The first server responds to the query of the core segment PE device address and the core segment AC ID according to a pre-configured mapping relationship between an access segment AC ID and the core segment PE device address or a pre-configured mapping relationship between the access segment AC ID and the core segment AC ID. The egress node information is used to indicate the direction of the PW or the LSP, and is usually a PE device address.

The access segment AC ID corresponds to the port. The port includes the ONU port and/or the OLT port. The AC ID may be just the port information, or a logic number of the port information. If the AC ID is a logic number of the port information, the first server needs to pre-configure a mapping relationship between the AC ID and the port.

Step 306: Manage a core segment PW to a core segment PE device, and manage the PW label of the core segment PW according to the core segment PE device address and the core segment AC ID.

In an application scenario of this embodiment of the present invention, the S-PE device is an edge node, a BNG, or a metropolitan area convergence node, so the S-PE device supports a protocol such as T-LDP or BGP. The S-PE device establishes, modifies, or deletes the core segment PW with the core segment PE device through T-LDP or BGP according to the core segment PE device address and the core segment AC ID, and allocates, modifies, or deletes PW labels of the core segment PW in two directions. In this case, PWE3 is supported on a data plane of the PON access segment without requiring the OLT and the ONU to support protocols such as RIP, LDP or RSVP, and T-LDP or BGP, and without increasing device complexity of the OLT and the ONU.

In another application scenario of this embodiment of the present invention, the S-PE device is an OLT, so the OLT needs to be modified to support T-LDP or BGP. The OLT establishes, modifies, or deletes the core segment PW with the core segment PE device through T-LDP or BGP according to the core segment PE device address and the core segment AC ID, and allocates, modifies, or deletes PW labels of the core segment PW in two directions. In this case, the PWE3 is supported on the data plane of the PON access segment without requiring the ONU to support the protocols such as RIP, LDP or RSVP, and T-LDP or BGP, and without increasing the device complexity of the ONU.

Step 308: Establish, update, or release a mapping relationship between the PW label of the core segment PW and the PW label of the access segment PW.

For MPLS-based PWE3, in order to form a complete end-to-end MPLS-based PWE3, the core segment PW and the access segment PW need to be associated at the S-PE device, so the S-PE establishes, updates, modifies, or deletes the mapping relationship between the PW label of the core segment PW and the PW label of the access segment PW. It should be understood by persons of ordinary skill in the art that Step 308 shall be performed after the PW labels are allocated for both the access segment PW and the core segment PW.

Figure 4:
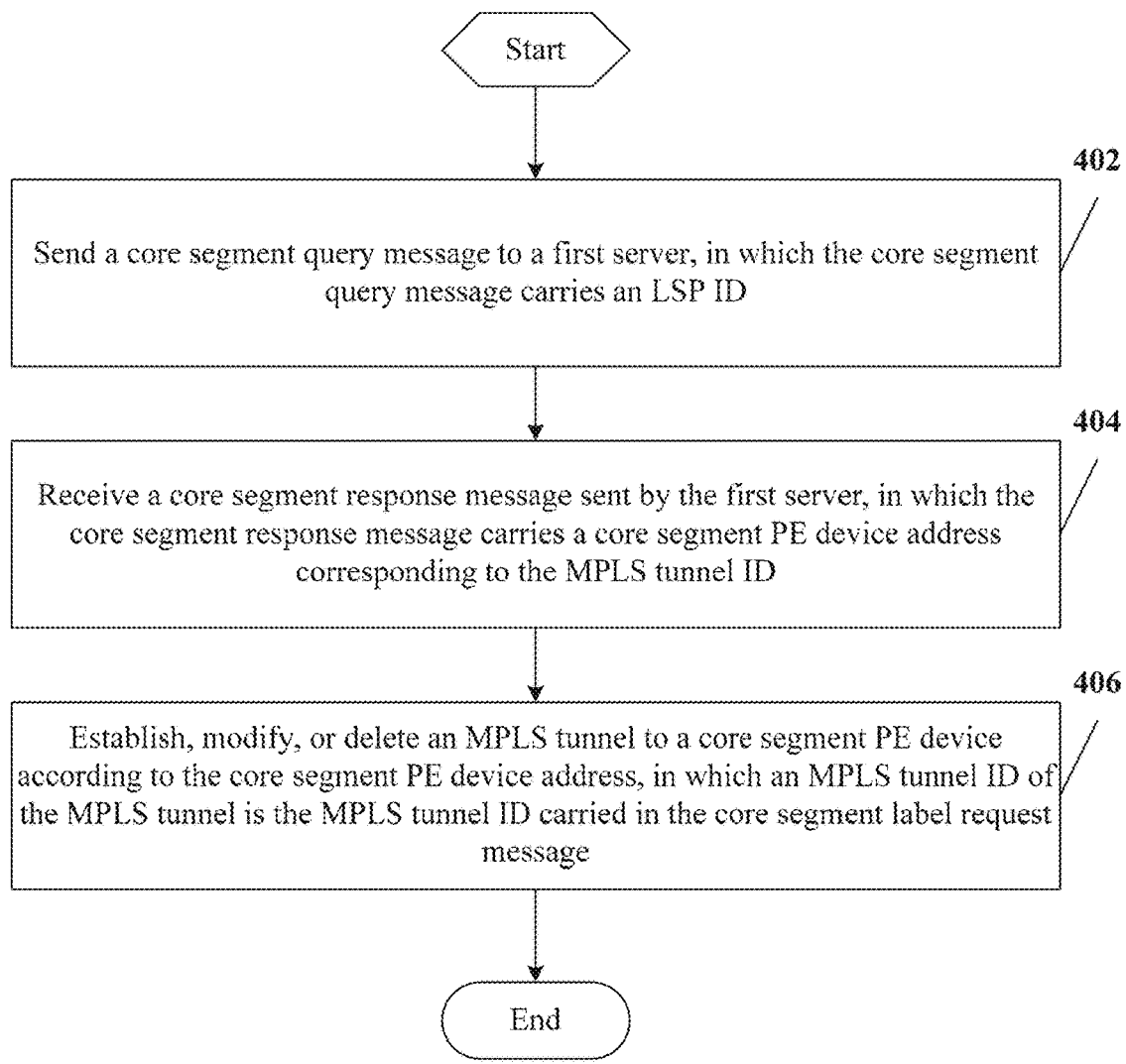
FIG. 4 is a flow chart of a corresponding method for managing a network core segment label when a label is allocated for an MPLS tunnel ID according to an embodiment of the present invention.

Referring to FIG. 4, FIG. 4 is a flow chart of a corresponding method for managing a network core segment label when a label is allocated for an MPLS tunnel ID according to an embodiment of the present invention. The method includes:

Step 402: Send a core segment query message to a first server, in which the core segment query message carries an MPLS tunnel ID.

For example, the first server may be an AAA server or a policy server, an S-PE device sends the core segment query message to the server to request an egress node address of a core segment MPLS LSP, and the address is usually an egress PE device address.

Step 404: Receive a core segment response message sent by the first server, in which the core segment response message carries a core segment PE device address corresponding to the MPLS tunnel ID.

The core segment PE device address corresponding to the MPLS tunnel ID is queried and found according to the MPLS tunnel ID. The S-PE device receives the core segment response message sent by the first server. The core segment response message carries the core segment PE device address. The core segment response message may further carry a policy or a profile, and the policy or the profile is used to provide information about, such as, a QoS policy, timing, and billing.

In order to indicate a corresponding relationship between the MPLS tunnel ID and the egress node address, the MPLS tunnel ID in the corresponding core segment query message may be carried in the core segment response message.

The first server responds to the query of the core segment PE device address according to a pre-configured mapping relationship between the MPLS tunnel ID and the core segment PE device address.

Step 406: Manage an MPLS tunnel to a core segment PE device according to the core segment PE device address, in which an MPLS tunnel ID of the MPLS tunnel is the MPLS tunnel ID carried in the core segment query message.

In an application scenario of this embodiment of the present invention, the S-PE device is an edge node, a BNG, or a metropolitan area convergence node, so the S-PE device supports a protocol such as LDP or RSVP. The S-PE device establishes, modifies, or deletes a core segment MPLS tunnel with the core segment PE device through LDP or RSVP according to the core segment PE device address, and allocates, modifies, or deletes the MPLS label of the core segment MPLS tunnel. In this case, MPLS is supported on a data plane of a PON access segment without requiring an OLT and an ONU to support protocols such as RIP, LDP or RSVP, and T-LDP or BGP, and without increasing device complexity of the OLT and the ONU.

In another application scenario of this embodiment of the present invention, the S-PE device is an OLT, so the OLT needs to be modified to support LDP or RSVP. The OLT establishes, modifies, or deletes the core segment MPLS tunnel with the core segment PE device through LDP or RSVP according to the core segment PE device address. In this case, the MPLS is supported on the data plane of the PON access segment without requiring the ONU to support the protocols such as RIP, LDP or RSVP, and T-LDP or BGP, and without increasing the device complexity of the ONU.

The first server and the second server may be two independent physical devices, which communicate with each other to synchronize association information of the access segment and the core segment, and may also be an integrated physical device.

In this embodiment of the present invention, tunnel establishment is taken as an example to describe a label distribution process. It should be understood by persons of ordinary skill in the art that a method for modifying or deleting a label is similar to the foregoing management method, in which a new parameter may be carried in the label management message to indicate a corresponding relationship in the message for deleting a label, a new message may also be defined to instruct the PE device to delete a label, and the message also adopts the access network management protocol.

Figure 5:
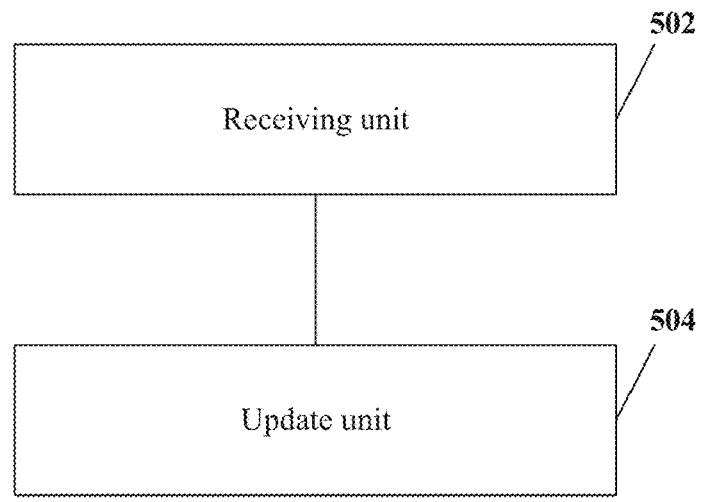
FIG. 5 is a block diagram of a PE device according to an embodiment of the present invention.

FIG. 5 is a block diagram of a PE device according to an embodiment of the present invention. The PE device includes a receiving unit 502 and an update unit 504.

The receiving unit 502 is configured to receive a label management message from an S-PE device, in which the label management message adopts an access network management protocol, and the label management message carries a corresponding relationship between port information of a port and an MPLS label, or a corresponding relationship between the port information of the port and a PW label, or a corresponding relationship between an MPLS tunnel ID of an MPLS tunnel and the MPLS label.

The PE device is usually deployed on a user side. For example, the PE device may be an ONU. The receiving unit 502 receives a label allocation, modification, or deletion message from an OLT. The message may be sent by the OLT used as the S-PE device, or may be the label allocation, modification, or deletion message that is forwarded to the ONU directly or after being processed correspondingly after the OLT used as a P device receives the label allocation, modification, or deletion message sent by an IP edge node, a BNG, or a metropolitan area convergence node used as the S-PE device. The label allocation, modification, or deletion message adopts the access network management protocol, and the access network management protocol may be an OMCI protocol, an Ethernet OAM protocol, L2CP, a TR069 protocol, or an AAA protocol.

The update unit 504 is configured to update a forwarding table according to the corresponding relationship.

In order to enable data of MPLS-based PWE3 on a data plane to be forwarded correctly, the update unit 504 updates the forwarding table according to a label and port information or an MPLS tunnel ID corresponding to the label, in which the forwarding table includes an FIB.

If the label allocation, modification, or deletion message carries the port information of the port, the updating, by the update unit 504, the forwarding table specifically includes: associating the label with the port according to a mapping relationship between the label and the port.

In order that data entering each specified access loop or each specified ATM cell, TDM timeslot, ETH frame, or IP packet entering a network is designated to a specified FEC, in which the FEC is a coded port (such as an ONU port and/or an OLT port) or an AC ID, the update unit 504 associates the PW label or the MPLS label with the port according to the mapping relationship between the label and the port. Therefore, on the data plane, according to an association relationship between the PW label or the MPLS label and the port, data entering a specified ONU port is encapsulated into a frame having the corresponding PW label or the corresponding MPLS label, or after a frame having the specified PW label is decapsulated, data is forwarded by the corresponding port.

Figure 6:
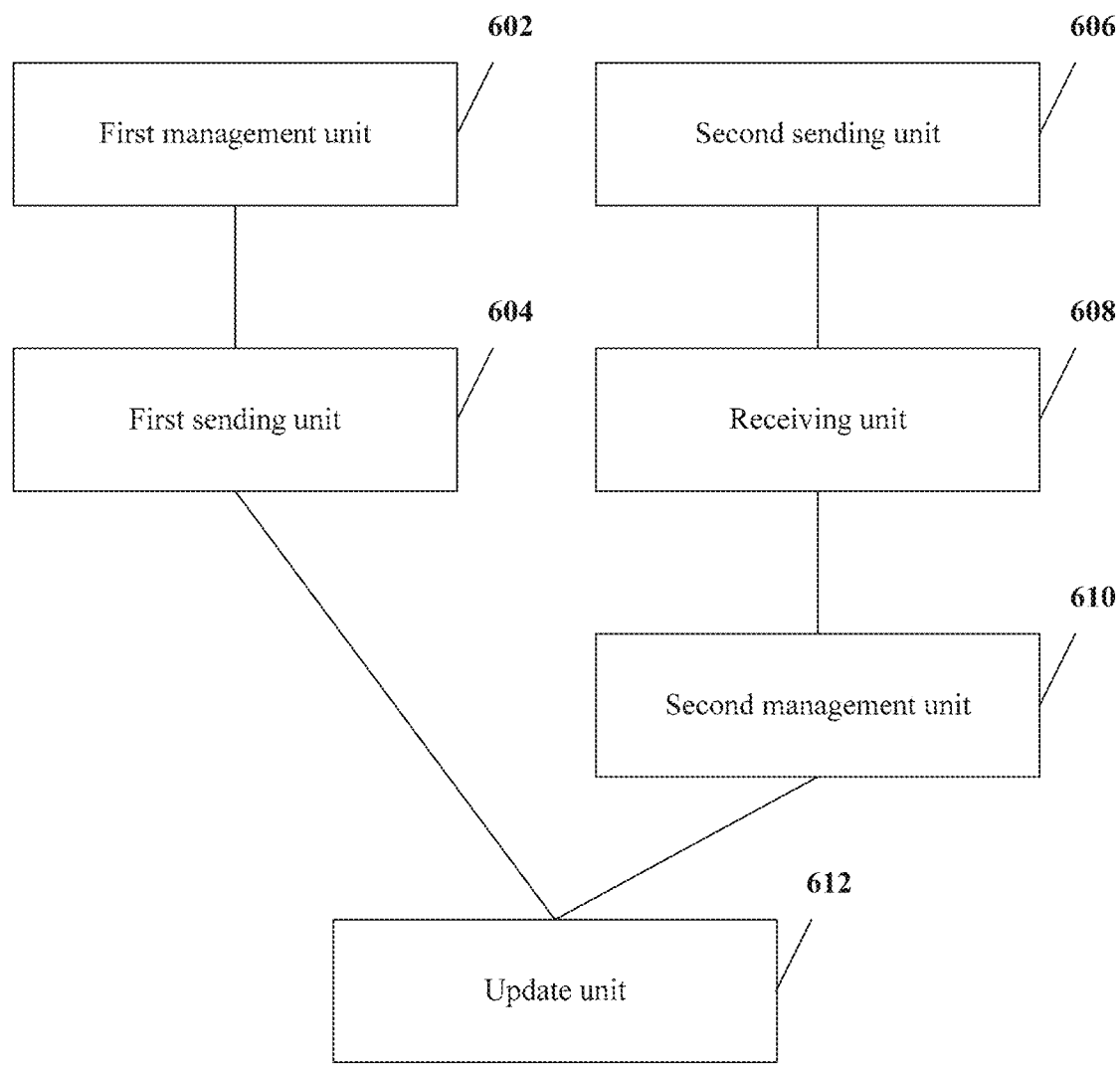
FIG. 6 is a block diagram of an S-PE device according to an embodiment of the present invention.

FIG. 6 is a block diagram of an S-PE device according to an embodiment of the present invention. The device includes a first management unit 602 and a first sending unit 604.

The first management unit 602 is configured to manage a PW label of an access segment PW or an MPLS label of an access segment MPLS tunnel for a port or an MPLS tunnel, and manage a corresponding relationship between port information of the port and the MPLS label, or manage a corresponding relationship between the port information of the port and the PW label, or manage a corresponding relationship between an MPLS tunnel ID of the MPLS tunnel and the MPLS label.

The first management unit 602 allocates, modifies, or deletes a label for the port or the MPLS tunnel. When a label is allocated, modified, or deleted for the port (such as an ONU port and/or an OLT port), the label is the PW label of the access segment PW or the MPLS label. When a label is allocated, modified, or deleted for the MPLS tunnel, the label is the MPLS label of the access segment MPLS tunnel.

When the S-PE device is an IP edge node, a BNG, or a metropolitan area convergence node, when allocating, modifying, or deleting the MPLS label for the MPLS tunnel, the first management unit 602 may allocate, modify, or delete MPLS labels between the S-PE device and an OLT and between the OLT and an ONU at the same time, or may only allocate, modify, or delete the MPLS label between the S-PE device and the OLT, and the OLT allocates, modifies, or deletes the MPLS label between the OLT and the ONU.

The first sending unit 604 is configured to send a label allocation, modification, or deletion message to a PE device, in which the label allocation, modification, or deletion message adopts an access network management protocol, the label allocation, modification, or deletion message carries the corresponding relationship, and the label allocation, modification, or deletion message enables the PE device to update a forwarding table according to the corresponding relationship.

For example, in a PON, the PE device is the ONU. When the S-PE device is the OLT, the access network management protocol includes an OMCI protocol, an Ethernet OAM protocol, L2CP, a TR069 protocol, or an AAA protocol.

When the S-PE device is an IP edge node, a BNG, or a metropolitan area convergence node, the S-PE device is an upper layer device of the OLT, and the label allocation, modification, or deletion message needs to be sent to the ONU through the OLT. The access network management protocol includes L2CP, the TR069 protocol, the Ethernet OAM protocol, or the AAA protocol because the S-PE device does not support the OMCI protocol. In this case, the OLT needs to forward the label allocation, modification, or deletion message to the ONU. The OLT may directly forward the message to the ONU after detecting the label allocation, modification, or deletion message, in which the ONU also needs to support L2CP, the TR069 protocol, or the AAA protocol, and the OLT may also convert the message into a message of the OMCI protocol or the Ethernet OAM protocol after detecting the label allocation, modification, or deletion message, and the forward the converted message to the ONU.

In order to form a complete end-to-end MPLS-based PW and/or LSP, the PW and/or the LSP needs to be established, modified, or deleted at a core segment, and a core segment label needs to be allocated, modified, or deleted. For the PW, a core segment MPLS-based PW and an access segment MPLS-based PW further need to be associated at the S-PE device. Therefore, in the PON, the device may further include a second sending unit 606, a receiving unit 608, a second management unit 610, and an update unit 612.

The second sending unit 606 is configured to send a core segment query message to a first server. When the label management message carries the corresponding relationship between the port information of the port and the PW label, the core segment query message carries the OLT port and the ONU port. When the label management message carries the corresponding relationship between the MPLS tunnel ID of the MPLS tunnel and the MPLS label, the core segment label request message carries the MPLS tunnel ID.

When the label management message carries the corresponding relationship between the port information of the port and the PW label, the second sending unit 606 sends the core segment query message to the server to request a core segment AC ID and an egress node address. Both the OLT port and the ONU port in the query message may be added by the ONU or the OLT alone, or the ONU port and the OLT port may be added by the ONU and the OLT respectively.

When the label management message carries the corresponding relationship between the MPLS tunnel ID of the MPLS tunnel and the MPLS label, the second sending unit 606 sends the core segment query message to the server to request an egress node address of a core segment MPLS LSP, in which the address is usually an egress PE device address.

The receiving unit 608 is configured to receive a core segment response message sent by the first server. When the label management message carries the corresponding relationship between the port information of the port and the PW label, the core segment response message carries a core segment PE device address and core segment AC IDs in two directions corresponding to the OLT port and the ONU port. When the label management message carries the corresponding relationship between the MPLS tunnel ID of the MPLS tunnel and the MPLS label, the core segment response message carries a core segment PE device address corresponding to the MPLS tunnel ID.

When the label management message carries the corresponding relationship between the port information of the port and the PW label, the receiving unit 608 receives the core segment response message sent by the first server. The core segment response message carries the core segment PE device address and the core segment AC ID. The core segment response message may further carry a policy or a profile, and the policy or the profile is used to provide information about, such as, a QoS policy, timing, and billing.

PWs or LSPs in different directions have their respective core segment AC IDs, so the core segment response message shall include core segment AC IDs in two directions, or the receiving unit 608 receives the core segment response message that is sent twice and carries a core segment AC ID of one direction each time. No matter which scheme is adopted, a direction of the PW or the LSP to which each of the two AC IDs corresponds needs to be indicated, and a common practice is to indicate respective corresponding egress node information of each of the two AC IDs.

In order to indicate a mapping relationship between a core segment PW and an access segment PW or a mapping relationship between a core segment LSP and an access segment LSP, the corresponding OLT port and ONU port may be carried in the core segment response message.

The access segment AC ID corresponds to the port. The port includes the ONU port and/or the OLT port. The AC ID may be just the port information, or a logic number of the port information. If the AC ID is a logic number of the port information, the first server needs to pre-configure a mapping relationship between the AC ID and the port.

When the label management message carries the corresponding relationship between the MPLS tunnel ID of the MPLS tunnel and the MPLS label, the receiving unit 608 receives the core segment response message sent by the first server. The core segment response message carries the core segment PE device address. The core segment response message may further carry a policy or a profile, and the policy or the profile is used to provide information about, such as, a QoS policy, timing, and billing.

The second management unit 610 is configured to manage a core segment PW to a core segment PE device according to the core segment PE device address and the core segment AC IDs in the two directions, and manage a PW label of the core segment PW when the label management message carries the corresponding relationship between the port information of the port and the PW label; and manage an MPLS tunnel to the core segment PE device according to the core segment PE device address when the label management message carries the corresponding relationship between the MPLS tunnel ID of the MPLS tunnel and the MPLS label. An MPLS tunnel ID of the MPLS tunnel is the MPLS tunnel ID carried in the core segment query message.

In an application scenario of this embodiment of the present invention, the S-PE device is an edge node, a BNG, or a metropolitan area convergence node, so the S-PE device supports protocols such as T-LDP or BGP and LDP or RSVP. When the label allocation, modification, or deletion message carries the corresponding relationship between the port information of the port and the PW label, the second management unit 610 establishes, modifies, or deletes the core segment PW with the core segment PE device through T-LDP or BGP according to the core segment PE device address and the core segment AC ID, and allocates, modifies, or deletes PW labels of the core segment PW in two directions. When the label allocation, modification, or deletion message carries the corresponding relationship between the MPLS tunnel ID of the MPLS tunnel and the MPLS label, the second management unit 610 establishes, modifies, or deletes the core segment MPLS tunnel with the core segment PE device through LDP or RSVP according to the core segment PE device address, and allocates, modifies, or deletes the MPLS label of the core segment MPLS tunnel. In this case, PWE3 is supported on a data plane of a PON access segment without requiring the OLT and the ONU to support the protocols such as RIP, LDP or RSVP, and T-LDP or BGP, and without increasing device complexity of the OLT and the ONU.

In another application scenario of this embodiment of the present invention, the S-PE device is an OLT, so the OLT needs to be modified to support T-LDP or BGP and LDP or RSVP. When the label allocation, modification, or deletion message carries the corresponding relationship between the port information of the port and the PW label, the second management unit 610 establishes, modifies, or deletes the core segment PW with the core segment PE device through T-LDP or BGP according to the core segment PE device address and the core segment AC ID, and allocates, modifies, or deletes the PW labels of the core segment PW in the two directions. When the label allocation, modification, or deletion message carries the corresponding relationship between the MPLS tunnel ID of the MPLS tunnel and the MPLS label, the second management unit 610 establishes, modifies, or deletes the core segment MPLS tunnel with the core segment PE device through LDP or RSVP according to the core segment PE device address, and allocates, modifies, or deletes the MPLS label of the core segment MPLS tunnel. In this case, the PWE3 is supported on the data plane of the PON access segment without requiring the ONU to support the protocols such as RIP, LDP or RSVP, and T-LDP or BGP, and without increasing the device complexity of the ONU.

The update unit 612 is configured to establish, delete, update or modify a mapping relationship between the PW label of the core segment PW and the PW label of the access segment PW when the label allocation, modification, or deletion message carries the corresponding relationship between the port information of the port and the PW label.

Figure 7:
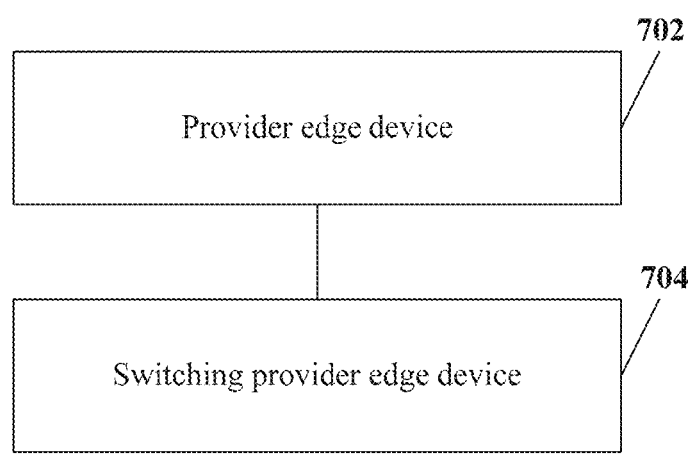
FIG. 7 is a block diagram of an access system of an access network according to an embodiment of the present invention.
Figure 8:
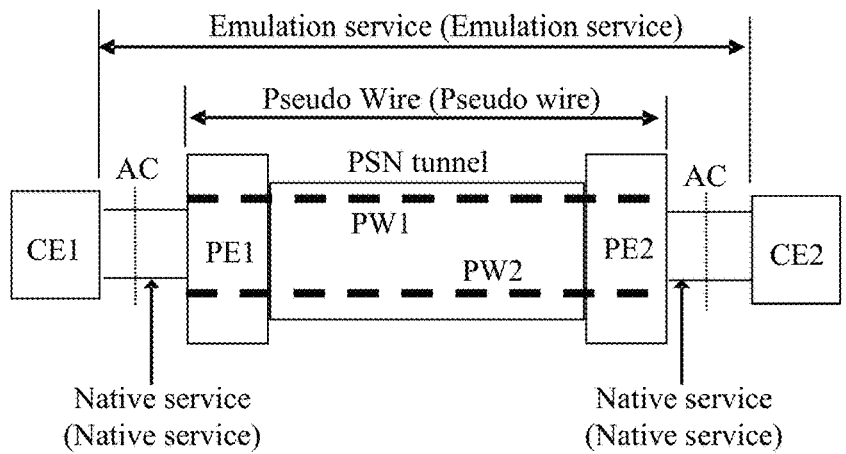
FIG. 8 is a schematic reference diagram of a network of a point-to-point PW.

FIG. 7 is a block diagram of an access system of an access network according to an embodiment of the present invention. The system includes an S-PE device 704 and at least one PE device 702.

The PE device 702 is configured to receive a label management message from the S-PE device 704, in which the label management message adopts an access network management protocol, and the label management message carries a corresponding relationship between port information of a port and an MPLS label, or a corresponding relationship between the port information of the port and a PW label, or a corresponding relationship between an MPLS tunnel ID of an MPLS tunnel and the MPLS label, and update a forwarding table according to the corresponding relationship.

For example, in a PON, the PE device is an ONU.

The ONU receives the label management message from the S-PE device 704, in which the label management message adopts the access network management protocol, and the access network management protocol may be an OMCI protocol, an Ethernet OAM protocol, L2CP, a TR069 protocol, or an AAA protocol.

In order to enable data of MPLS-based PWE3 on a data plane to be forwarded correctly, the ONU updates the forwarding table according to a label and port information or an MPLS tunnel ID corresponding to the label, in which the forwarding table includes an FIB.

If the label is a PW label, in order that data entering each specified access loop, or each specified ATM cell, TDM timeslot, ETH frame, or IP packet entering a network is designated to a specified FEC, in which the FEC is coded to be a PW label, the ONU associates the PW label with an ONU port according to a mapping relationship between the label and the ONU port. Therefore, on the data plane, according to an association relationship between the PW label and the ONU port, data entering a specified ONU port is encapsulated into a frame having the corresponding PW label, or after a frame having the specified PW label is decapsulated, data is forwarded by the corresponding ONU port.

The S-PE device 704 is configured to manage a PW label of an access segment PW or an MPLS label of an access segment MPLS tunnel for the port or the MPLS tunnel, and send the label management message to the PE device 702.

The S-PE device 704 allocates, modifies, or deletes a label for the port information or the MPLS tunnel ID. When a label is allocated, modified, or deleted for the port, the label is the PW label of the access segment PW or the MPLS label. When a label is allocated, modified, or deleted for the MPLS tunnel, the label is the MPLS label of the access segment MPLS tunnel.

Specific application scenarios of this embodiment of the present invention are described below with reference to FIG. 9 to FIG. 25.

Figure 9:
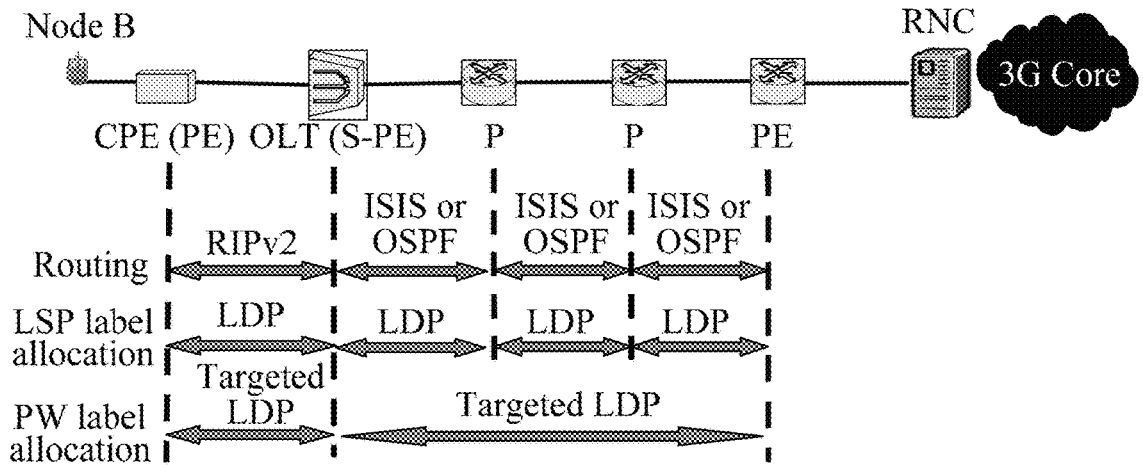
FIG. 9 is a schematic diagram of a network supporting PWE3 at a PON access segment.

FIG. 9 is a schematic diagram of a network supporting PWE3 at a PON access segment. When an implementation scheme of supporting the PWE3 at the PON access segment as shown in FIG. 9 is adopted, in order to support the PWE3 at the PON access segment, all ONUs and OLTs need to upgrade a control plane to Layer 3, and support a routing protocol (for example, Routing Information Protocol version 2 (RIPv2)), an MPLS LDP (for example, LDP/RSVP), and a PW LDP (for example, T-LDP/BGP), which causes high complexity, high cost, and poor scalability to an ONU and an OLT.

Figure 10:
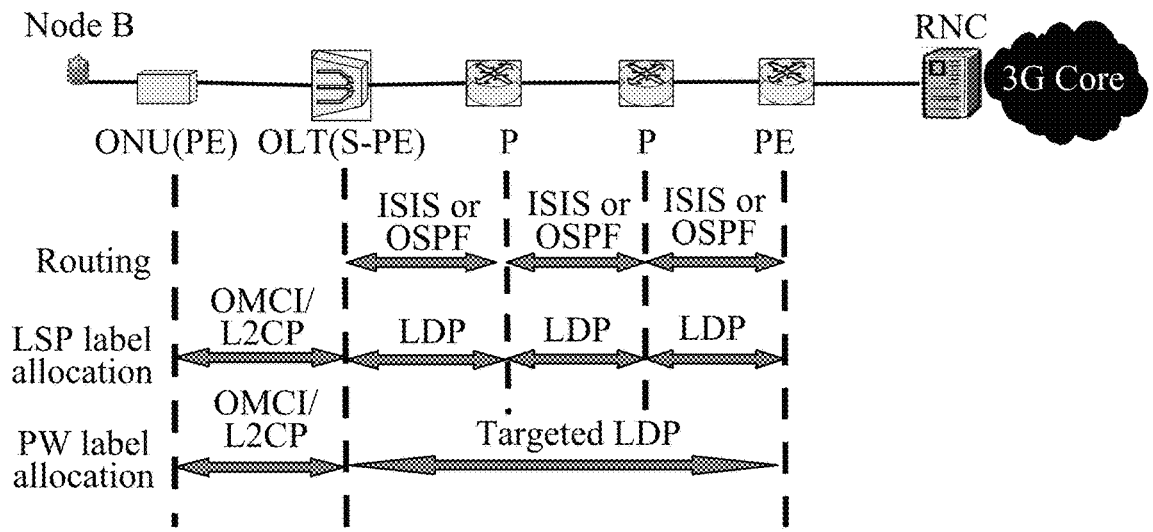
FIG. 10 is a schematic diagram of a network supporting PWE3 at a PON access segment in a specific application scenario according to an embodiment of the present invention.

FIG. 10 is a schematic diagram of a network supporting PWE3 at a PON access segment in a specific application scenario according to an embodiment of the present invention. In this specific application scenario, a PE device is an ONU, and an S-PE device is an OLT. A PON mobile bearer network is divided into an access segment and a core segment, in which a part from the ONU to the OLT is the access segment, and a part from the OLT to the PE device that is on the other side and connected to an RNC is the core segment.

The PON access segment may adopt a non-routing protocol, for example, a configuration protocol specific to an access network is adopted to perform label management (for example, allocation, modification, or deletion of a label), so as to implement management (for example, establishment and deletion of an LSP or a PW) on an MPLS LSP or PW of the access network, thereby reducing complexity of an access device, especially the complexity of the ONU. For example, one MPLS label and/or PW label or a set of MPLS labels and/or PW labels is allocated for the ONU by the OLT through L2CP (ANCP), an OMCI protocol, or an Ethernet OAM protocol, or by a server via the OLT through a TR069 protocol or an AAA protocol. In this way, the PWE3 is supported on a data plane of the PON access segment without increasing the device complexity of the ONU and with a slight change of a configuration of the ONU.

Figure 11:
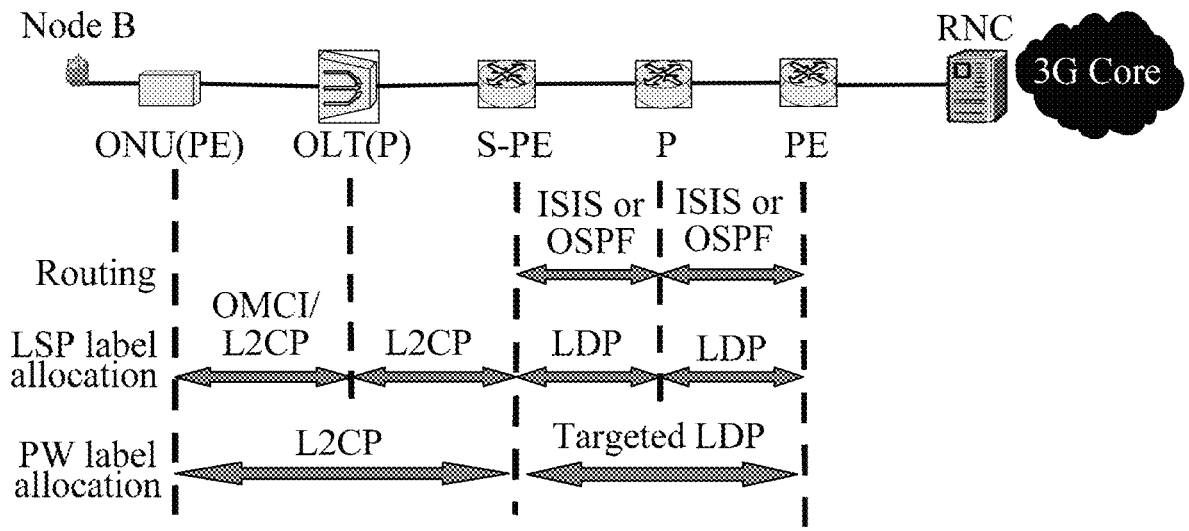
FIG. 11 is a schematic diagram of a network supporting PWE3 at a PON access segment in another specific application scenario according to an embodiment of the present invention.

FIG. 11 is a schematic diagram of a network supporting PWE3 at a PON access segment in another specific application scenario according to an embodiment of the present invention. In this specific application scenario, a PE device is an ONU, an OLT is a P device, and an S-PE device is behind the OLT (for example, an IP edge node). A PON mobile bearer network is divided into an access segment and a core segment, in which a part from the ONU to the S-PE is the access segment, and a part from the S-PE to the PE device that is on the other side and connected to an RNC is the core segment.

The access segment may adopt a non-routing protocol, for example, a configuration protocol specific to an access network is adopted to perform label management (for example, allocation, modification, or deletion of a label), so as to implement management (for example, establishment and deletion of an LSP or a PW) on an MPLS LSP or PW of the access network, thereby reducing complexity of an access device, especially the complexity of the ONU. For example, a PW label is allocated for the ONU by the OLT through L2CP (ANCP), an OMCI protocol, or an Ethernet OAM protocol, or by a server via the OLT through a TR069 protocol or an AAA protocol, and an MPLS label is allocated by the IP edge node (for example, a BNG) through L2CP (ANCP) or by a server via the IP edge node through the TR069/AAA protocol for the ONU and the OLT used as the P device. In this way, the PWE3 is supported on a data plane of the PON access segment without increasing the device complexity of the ONU and the OLT, and with a slight change of configurations of the ONU and the OLT.

A specific application scenario of the embodiment of the present invention is described below with reference to FIG. 12, in which an access segment and a core segment are separated by an S-PE.

Figure 12:
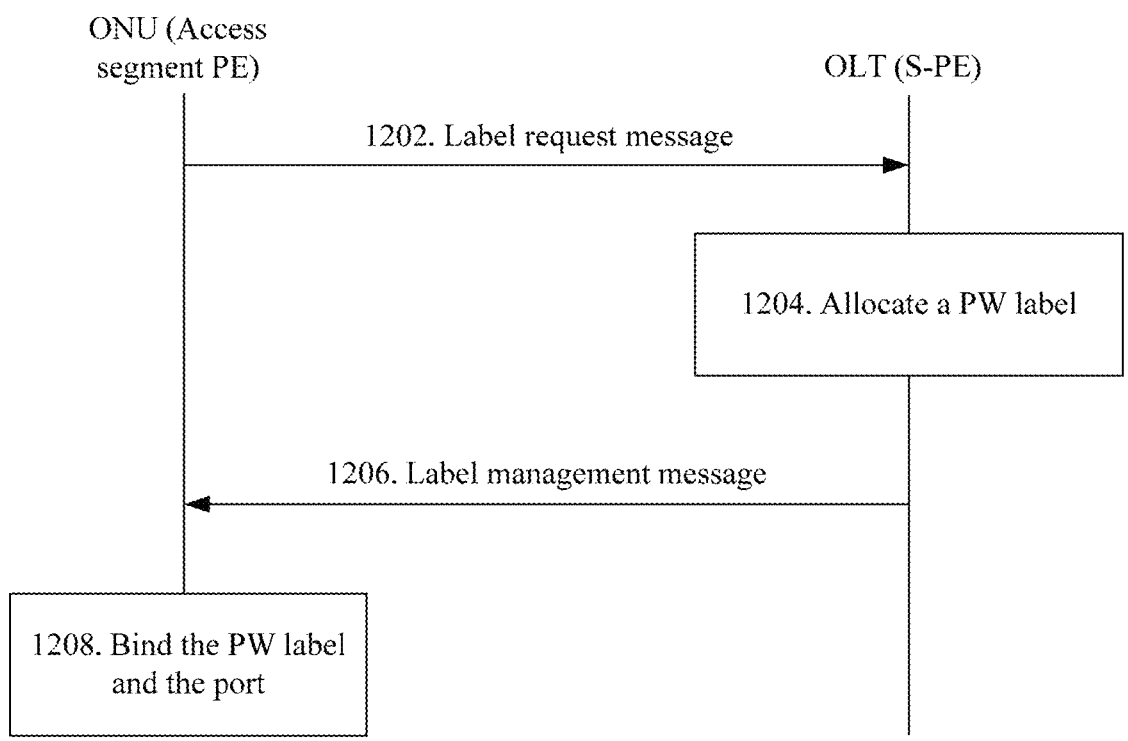
FIG. 12 is a schematic diagram of a method for managing a PW label of a PON in a specific application scenario according to an embodiment of the present invention.

FIG. 12 is a schematic diagram of a method for managing a PW label of a PON in a specific application scenario according to an embodiment of the present invention. In this application scenario, an OLT is an S-PE device. Taking an ONU port as an example, the method includes:

Step 1202: An ONU sends a label request message to the OLT. A protocol of the label request message may be an OMCI protocol, an Ethernet OAM protocol, L2CP, a TR069 protocol, or an AAA protocol. The label request message carries one ONU port or a set of ONU ports to request allocation of one PW label or a set of PW labels corresponding to the ONU port. When the OLT takes the initiative to perform label allocation, Step 1202 may be omitted.

Step 1204: The OLT allocates one PW label or a set of PW labels for the ONU port. If the PW label is unidirectional, a PW label from the ONU to the OLT and a PW label from the OLT to the ONU that correspond to the ONU port are allocated.

Step 1206: The OLT sends a label management message to the ONU. A protocol of the label management message may be the OMCI protocol, the Ethernet OAM protocol, L2CP, the TR069 protocol, or the AAA protocol. The label management message carries the ONU port and a corresponding PW label.

Step 1208: The ONU updates a forwarding table according to the ONU port and the allocated PW label. The updating the forwarding table specifically includes associating the PW label with the ONU port.

Another specific application scenario of the embodiment of the present invention is described below with reference to FIG. 13.

Figure 13:
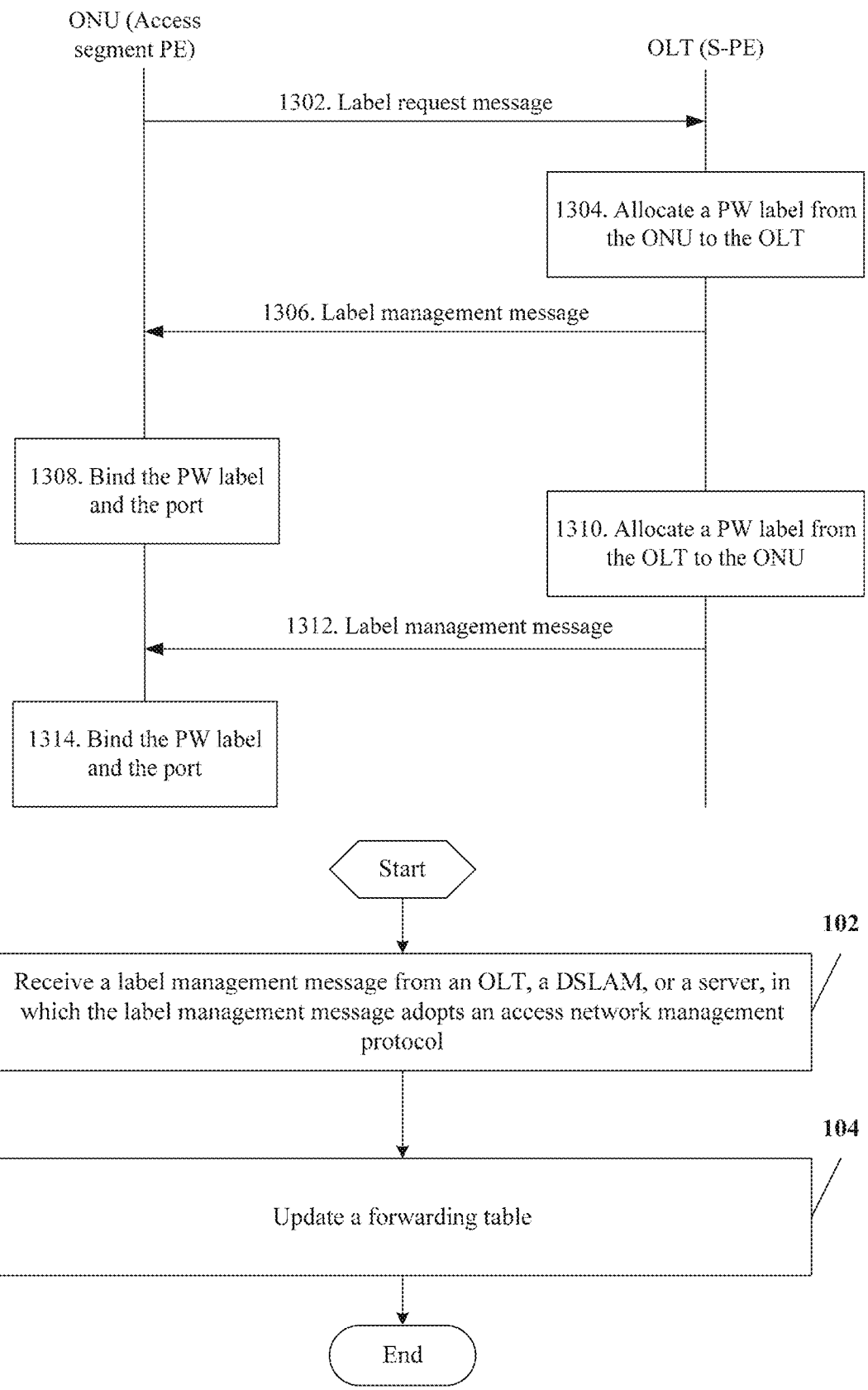
FIG. 13 is a schematic diagram of a method for managing a PW label of a PON in another specific application scenario according to an embodiment of the present invention.

FIG. 13 is a schematic diagram of a method for managing a PW label of a PON in another specific application scenario according to an embodiment of the present invention. In this application scenario, an S-PE device is an OLT. The method includes:

Step 1302: An ONU sends a label request message to an OLT. A protocol of the label request message may be an OMCI protocol, an Ethernet OAM protocol, L2CP, a TR069 protocol, or an AAA protocol. The label request message carries one ONU port or a set of ONU ports and egress node information. In this case, an egress node is the OLT, that is, a PW label from the ONU to the OLT is requested to be allocated. When the OLT takes the initiative to perform label allocation, Step 1302 may be omitted.

Step 1304: The OLT allocates one PW label or a set of PW labels from the ONU to the OLT for the ONU port.

Step 1306: The OLT sends a label management message to the ONU. A protocol of the label management message may be the OMCI protocol, the Ethernet OAM protocol, L2CP, the TR069 protocol, or the AAA protocol. The label management message carries the ONU port and the PW label from the ONU to the OLT.

Step 1308: The ONU updates a forwarding table according to the ONU port and the PW label. The updating the forwarding table specifically includes associating the PW label from the ONU to the OLT with the ONU port.

Step 1310: The OLT allocates one PW label or a set of PW labels from the OLT to the ONU for the ONU port.

Step 1312: The OLT sends a label management message to the ONU. A protocol of the label management message may be the OMCI protocol, the Ethernet OAM protocol, L2CP, the TR069 protocol, or the AAA protocol. The label management message carries the ONU port and the PW label from the OLT to the ONU.

Step 1314: The ONU updates the forwarding table according to the ONU port and the PW label. The updating the forwarding table specifically includes associating the PW label from the OLT to the ONU with the ONU port.

Still another specific application scenario of the embodiment of the present invention is described below with reference to FIG. 14.

Figure 14:
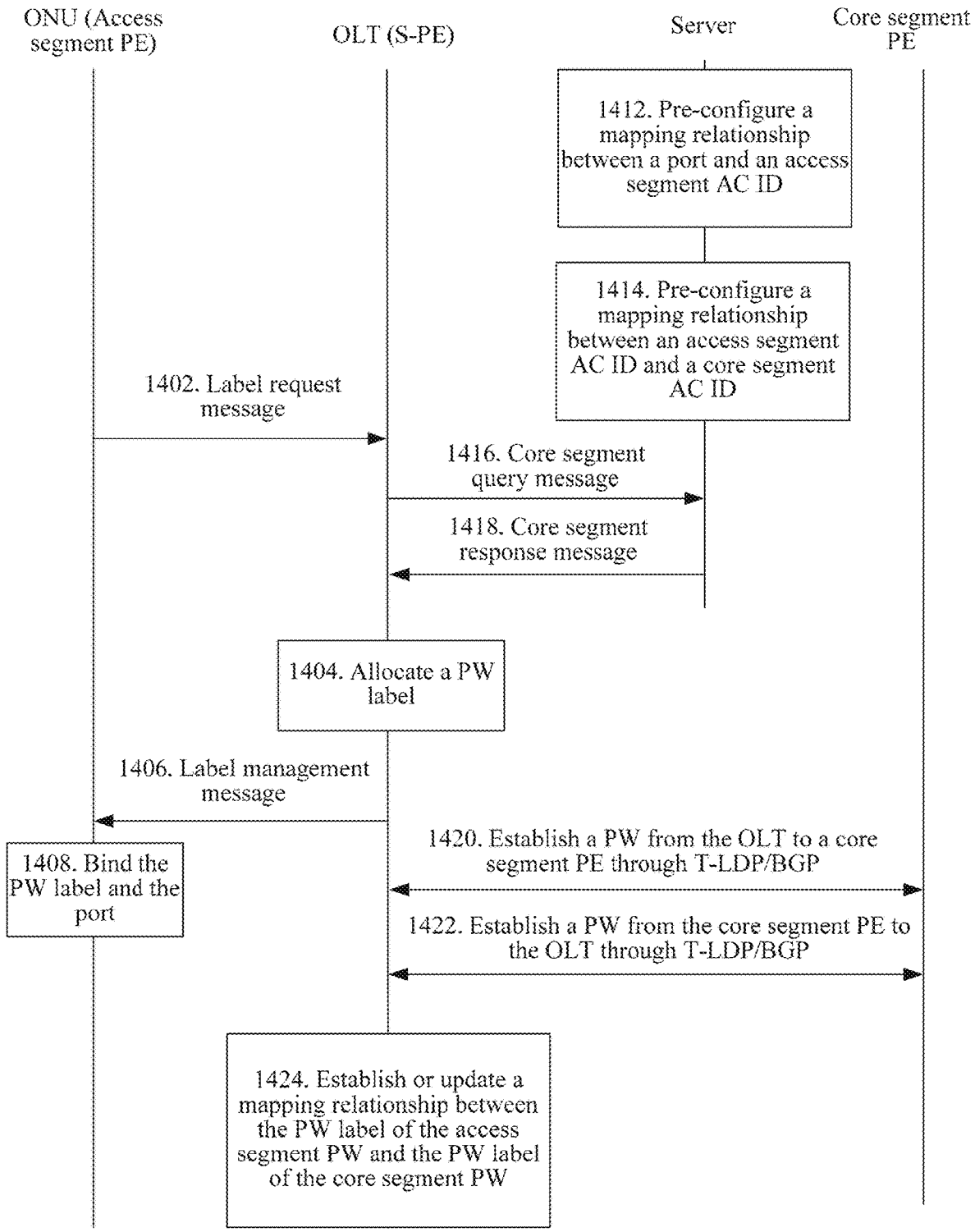
FIG. 14 is a schematic diagram of a method for managing a PW label of a PON in still another specific application scenario according to an embodiment of the present invention.

FIG. 14 is a schematic diagram of a method for managing a PW label of a PON in still another specific application scenario according to an embodiment of the present invention. In this application scenario, an S-PE device is an OLT. The method includes:

Step 1402: An ONU sends a label request message to an OLT. A protocol of the label request message may be an OMCI, an Ethernet OAM protocol, L2CP, a TR069 protocol, or an AAA protocol. The label request message carries an ONU port. When the OLT takes the initiative to perform label allocation, Step 1402 may be omitted.

Step 1404: The OLT allocates a PW label for the ONU port.

Step 1406: The OLT sends a label management message to the ONU. A protocol of the label management message may be the OMCI protocol, the Ethernet OAM protocol, L2CP, the TR069 protocol, or the AAA protocol. The label management message carries the ONU port and the PW label.

Step 1408: The ONU updates a forwarding table according to the ONU port and the PW label. The updating the forwarding table specifically includes associating the PW label with the ONU port.

Step 1412: A server pre-configures a mapping relationship between an AC ID and the ONU port. If the AC ID is just port information rather than a logic number of the port information, Step 1412 may be omitted.

Step 1414: If the AC ID is a logic number of the port information, pre-configured, in the server, a mapping relationship between an access segment AC ID and a core segment AC ID. If the AC ID is just the port information, directly pre-configured, in the server, a mapping relationship between the core segment AC ID and access segment port information.

Step 1416: The OLT sends a core segment query message to the server, in which the core segment query message carries an OLT port and the ONU port.

Step 1418: The server sends a core segment response message to the OLT, in which the core segment response message carries a core segment PE device address and a core segment AC ID that correspond to the OLT port and the ONU port and are queried and found according to the OLT port and the ONU port.

In Steps 1416 to 1418, the OLT simultaneously queries, on the server, for example, an AAA server or a policy server, configuration information of a PW of a core segment in two directions (a direction from the ONU to the OLT of the access segment and a direction from the OLT to the ONU of the access segment) interconnected to a PW of the access segment in two directions (the direction from the ONU to the OLT of the access segment and the direction from the OLT to the ONU of the access segment), for example, an egress node address of the core segment PW and a policy or a profile corresponding to the core segment AC ID and/or the access segment AC ID, according to information about the ONU port and that about the OLT port.

For example, the core segment query message and the core segment response message may adopt an Access Request message and an Access Accept message of a RADIUS protocol respectively, or adopt a Diameter protocol (a type of AAA protocol) or a Common Open Policy Service (COPS) protocol.

Step 1420: Establish a PW from the OLT to a core segment PE through T-LDP/BGP according to the core segment PE device address and the core segment AC ID, and allocate a PW label of the PW.

Step 1422: Establish a PW from the core segment PE to the OLT through T-LDP/BGP according to the core segment PE device address and the core segment AC ID, and allocate a PW label of the PW.

Step 1424: The OLT establishes or updates a mapping relationship between the PW label of the access segment PW and the PW label of the core segment PW.

It should be understood by persons of ordinary skill in the art that Steps 1402 to 1408 relate to allocation of the PW label of the access segment PW, and Steps 1412 to 1422 relate to allocation of the PW label of the core segment PW. The allocation of the PW label of the access segment PW and the allocation of the PW label of the core segment PW are independent of each other, and FIG. 14 shows only a possible sequence.

When the allocation of the PW label of the core segment PW is performed before the allocation of the PW label of the access segment PW, the allocation of the PW label of the access segment PW may be triggered by the allocation of the PW label of the core segment PW, the allocation of the PW label of the access segment PW does not need to be triggered by the label request message. For the specific process, refer to FIG. 26.

Figure 26:
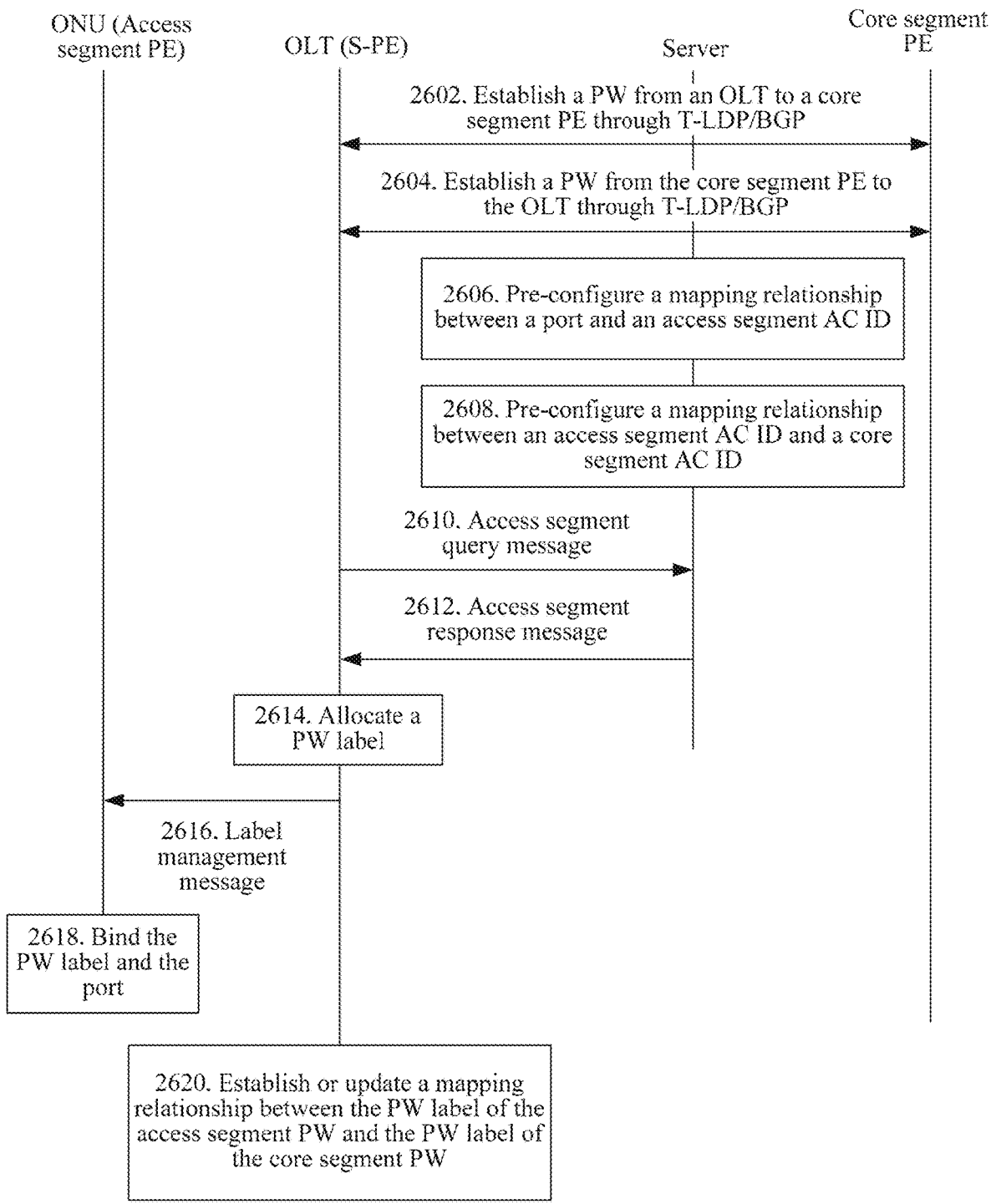
FIG. 26 is a schematic diagram of a method for managing a PW label of a PON in a specific application scenario according to an embodiment of the present invention, in which an S-PE device is an OLT in the application scenario.

FIG. 26 is a schematic diagram of a method for managing a PW label of a PON in a specific application scenario according to an embodiment of the present invention. In this application scenario, an S-PE device is an OLT. The method includes:

Step 2602: Manage a core segment PW through T-LDP or BGP. For example, establish a PW from an OLT to a core segment PE, and allocate a PW label of the PW.

Step 2604: Manage a core segment PW through T-LDP or BGP. For example, establish a PW from the core segment PE to the OLT, and allocate a PW label of the PW.

Step 2606: A server pre-configures a mapping relationship between an AC ID or a PW ID and a port. If the AC ID is just port information rather than a logic number of the port information, Step 2606 may be omitted.

Step 2608: If the AC ID or the PW ID is a logic number of the port information, pre-configured, in the server, a mapping relationship between an access segment AC ID and a core segment AC ID or between an access segment PW ID and a core segment PW ID. If the AC ID is just the port information, directly pre-configured, in the server, a mapping relationship between the core segment AC ID and access segment port information.

Step 2610: The management of the core segment PW triggers management of an access segment PW, and triggers the OLT to send an access segment query message to the server, in which the access segment query message carries the core segment AC ID or PW ID.

Step 2612: The server sends an access segment response message to the OLT, in which the access segment response message carries an access segment OLT port and/or ONU port corresponding to the core segment AC ID or PW ID and an address of an access segment PE device (for example, an ONU) corresponding to the core segment AC ID or PW ID that are queried according to the core segment AC ID or PW ID.

In Steps 2610 to 2612, the OLT queries, on the server, for example, an AAA server or a policy server, configuration information of a PW of an access segment in two directions (a direction from ONU to the OLT of the access segment and a direction from the OLT to the ONU of the access segment) interconnected to a PW of a core segment in two directions, for example, an egress node address of the access segment PW, the access segment AC ID or PW ID, and/or a policy or a profile corresponding to the access segment AC ID or PW ID, according to information about the core segment AC ID or PW ID. When the server and the OLT co-exist, Steps 2610 to 2612 may be simplified so that the access segment OLT port and/or ONU port corresponding to the core segment AC ID or PW ID and the address of the access segment PE device (for example, the ONU) corresponding to the core segment AC ID or PW ID are acquired within the device.

Step 2614: The management of the core segment PW triggers the management of the access segment PW, for example, establishment of the access segment PW and allocation of the PW label by the OLT for the ONU port.

Step 2616: The OLT sends a label management message to the ONU. A protocol of the label management message may be an OMCI protocol, an Ethernet OAM protocol, L2CP, a TR069 protocol, or an AAA protocol. The label management message carries the ONU port and the PW label.

Step 2618: The ONU updates a forwarding table according to the ONU port and the PW label. The updating the forwarding table specifically includes associating the PW label with the ONU port.

Step 2620: The OLT establishes or updates a mapping relationship between the PW label of the access segment PW and the PW label of the core segment PW.

Another specific application scenario of the embodiment of the present invention is described below with reference to FIG. 15.

Figure 15:
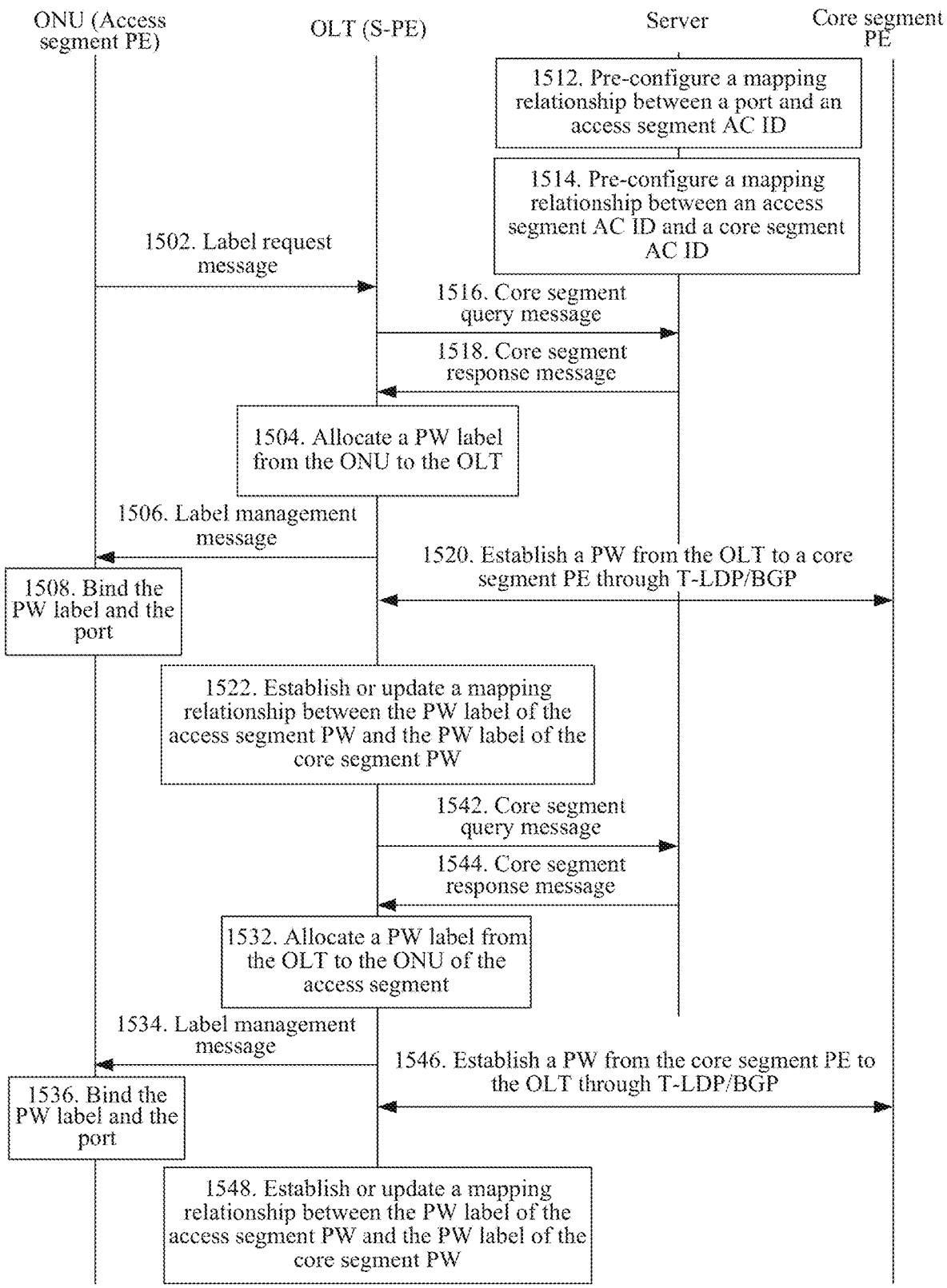
FIG. 15 is a schematic diagram of a method for managing a PW label of a PON in another specific application scenario according to an embodiment of the present invention.

FIG. 15 is a schematic diagram of a method for managing a PW label of a PON in another specific application scenario according to an embodiment of the present invention. In this application scenario, an S-PE device is an OLT. The method includes:

Step 1502: An ONU sends a label request message to an OLT. A protocol of the label request message may be an OMCI protocol, an Ethernet OAM protocol, L2CP, a TR069 protocol, or an AAA protocol. The label request message carries an ONU port and egress node information. In this case, the egress node information is the OLT, that is, a PW label from the ONU to the OLT is requested to be allocated. When the OLT takes the initiative to perform label allocation, Step 1502 may be omitted.

Step 1504: The OLT allocates the PW label from the ONU to the OLT for the ONU port.

Step 1506: The OLT sends a label management message to the ONU. A protocol of the label management message may be the OMCI protocol, the Ethernet OAM protocol, L2CP, the TR069 protocol, or the AAA protocol. The label management message carries the ONU port and the PW label from the ONU to the OLT.

Step 1508: The ONU updates a forwarding table according to the ONU port and the PW label. The updating the forwarding table specifically includes associating the PW label from the ONU to the OLT with the ONU port.

Step 1512: A server pre-configures a mapping relationship between an AC ID and a port. If the AC ID is just port information rather than a logic number of the port information, Step 1512 may be omitted.

Step 1514: If the AC ID is a logic number of the "port" information, pre-configured, in the server, a mapping relationship between an access segment AC ID and a core segment AC ID. If the AC ID is just the "port" information, directly pre-configured, in the server, a mapping relationship between the core segment AC ID and access segment "port" information.

Step 1516: The OLT sends a core segment query message to the server, in which the core segment query message carries an OLT port, the ONU port, and the egress node information (indicating a direction). In this case, the egress node information is the OLT, that is, configuration information of a core segment PW that corresponds to the PW from the ONU to the OLT of the access segment and is requested to be allocated.

Step 1518: The server sends a core segment response message to the OLT, in which the core segment response message carries a corresponding core segment PE device address and a corresponding core segment AC ID that are queried according to the OLT port, the ONU port, and the egress node information.

Step 1520: Establish a PW from the OLT to a core segment PE through T-LDP/BGP according to the core segment PE device address and the core segment AC ID, and allocate a PW label of the PW.

Step 1522: The OLT establishes or updates a mapping relationship between an access segment PW label of the PW from the ONU to the OLT and a core segment PW label of the PW from the OLT to the core segment PE, so as to support uplink (a direction from PE 1 to the ONU) PW switching.

Step 1532: The OLT allocates a PW label from the OLT to the ONU for the ONU port.

Step 1534: The OLT sends a label management message to the ONU. A protocol of the label management message may be the OMCI protocol, the Ethernet OAM protocol, L2CP, the TR069 protocol, or the AAA protocol. The label management message carries the ONU port and the PW label from the OLT to the ONU.

Step 1536: The ONU updates the forwarding table according to the ONU port and the PW label. The updating the forwarding table specifically includes associating the PW label from the OLT to the ONU with the ONU port.

Step 1542: The OLT sends a core segment query message to the server, in which the core segment query message carries the OLT port, the ONU port, and the egress node information (indicating a direction). In this case, the egress node information is the ONU, that is, configuration information of a core segment PW that corresponds to the PW from the OLT to the ONU of the access segment and is requested to be allocated.

Step 1544: The server sends a core segment response message to the OLT, in which the core segment response message carries a corresponding core segment AC ID queried according to the OLT port, the ONU port, and the egress node information.

Step 1546: Establish a PW from the core segment PE to the OLT through T-LDP/BGP according to the core segment PE device address and the core segment AC ID, and allocate a PW label of the PW.

Step 1548: The OLT establishes or updates a mapping relationship between an access segment PW label of the PW from the OLT to the ONU and a core segment PW label of the PW from the core segment PE to the OLT, so as to support downlink (a direction from the ONU to PE 1) PW switching.

In Steps 1516 to 1518 and Steps 1542 to 1544, the OLT respectively queries, on the server (for example, an AAA server or a policy server), configuration information of a PW from the OLT to PE 1 of the core segment interconnected to the PW from the ONU to the OLT of the access segment, and configuration information of the PW from PE 1 to the OLT of the core segment interconnected to the PW from the OLT to the ONU of the access segment, for example, an egress node address of the core segment PW, the core segment AC ID and/or a policy or a profile that corresponds to the access segment AC ID, according to information about the ONU port and that about the OLT port.

The query message carries "egress node: OLT" to indicate a direction from the ONU to the OLT of the access segment, and carries "egress node: ONU" to indicate a direction from the OLT to the ONU of the access segment.

The response message carries the core segment AC ID and/or the egress node address corresponding to the ONU port and the OLT port of the access segment, for example, an AC ID 1 from the OLT to PE 1 of the core segment and an address of the egress node PE 1, or an AC ID 2 from PE 1 to the OLT of the core segment and an address of the egress node OLT.

It should be understood by persons of ordinary skill in the art that Steps 1502 to 1508 relate to allocation of the PW label of the access segment PW from the ONU to the OLT, and Steps 1512 to 1520 relate to allocation of the PW label of the core segment PW from the OLT to the core segment PE. The allocation of the PW label of the access segment PW from the ONU to the OLT and the allocation of the PW label of the core segment PW from the OLT to the core segment PE are independent of each other, and FIG. 15 shows only a possible sequence. Steps 1532 to 1536 relate to allocation of the PW label of the access segment PW from the OLT to the ONU, and Steps 1542 to 1548 relate to allocation of the PW label of the core segment PW from the core segment PE to the OLT. The allocation of the PW label of the access segment PW from the OLT to the ONU and the allocation of the PW label of the core segment PW from the core segment PE to the OLT are independent of each other, and FIG. 15 shows only a possible sequence.

Still another specific application scenario of the embodiment of the present invention is described below with reference to FIG. 16.

Figure 16:
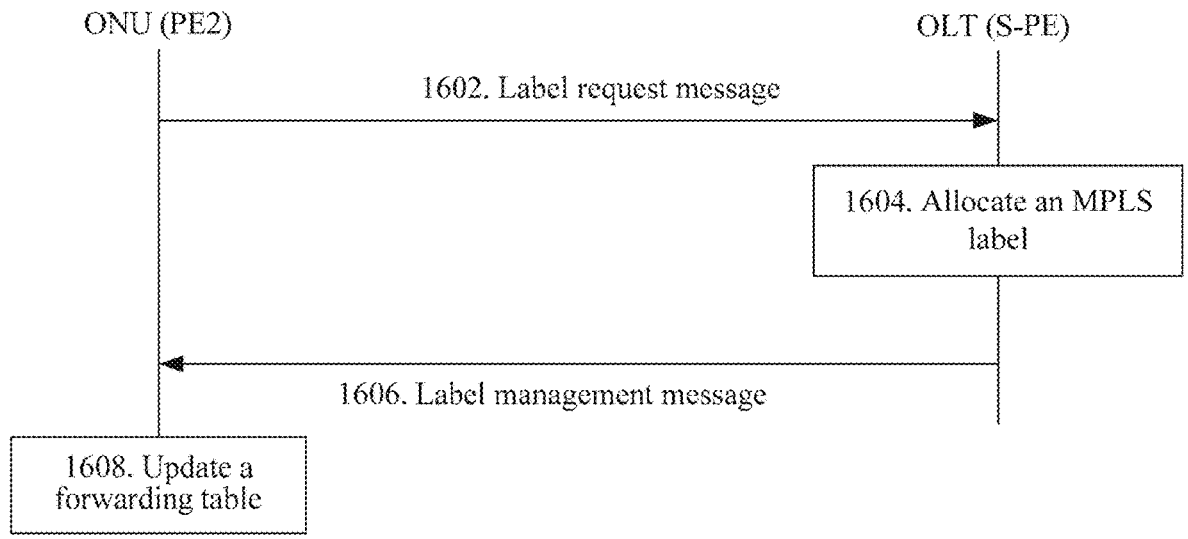
FIG. 16 is a schematic diagram of a method for managing an MPLS label of a PON in still another specific application scenario according to an embodiment of the present invention.

FIG. 16 is a schematic diagram of a method for managing an MPLS label of a PON in still another specific application scenario according to an embodiment of the present invention. In this application scenario, an S-PE device is an OLT. The method includes:

Step 1602: An ONU sends a label request message to an OLT. A protocol of the label request message may be an OMCI protocol, an Ethernet OAM protocol, L2CP, a TR069 protocol, or an AAA protocol. The label request message carries one MPLS tunnel ID or a set of MPLS tunnel IDs to request allocation of one MPLS label or a set of MPLS labels corresponding to the MPLS tunnel ID. When the OLT takes the initiative to perform label allocation, Step 1602 may be omitted.

Step 1604: The OLT allocates one MPLS label or a set of MPLS labels for the MPLS tunnel ID.

Step 1606: The OLT sends a label management message to the ONU. A protocol of the label management message may be the OMCI protocol, the Ethernet OAM protocol, L2CP, the TR069 protocol, or the AAA protocol. The label management message carries the MPLS tunnel ID and the corresponding MPLS label. If the MPLS tunnel is unidirectional, an MPLS label from the ONU to the OLT corresponding to an MPLS tunnel ID 1 and an MPLS label from the OLT to the ONU corresponding to an MPLS tunnel ID 2 are allocated.

Step 1608: The ONU updates a forwarding table according to the MPLS tunnel ID and the MPLS label.

Another specific application scenario of the embodiment of the present invention is described below with reference to FIG. 17.

Figure 17:
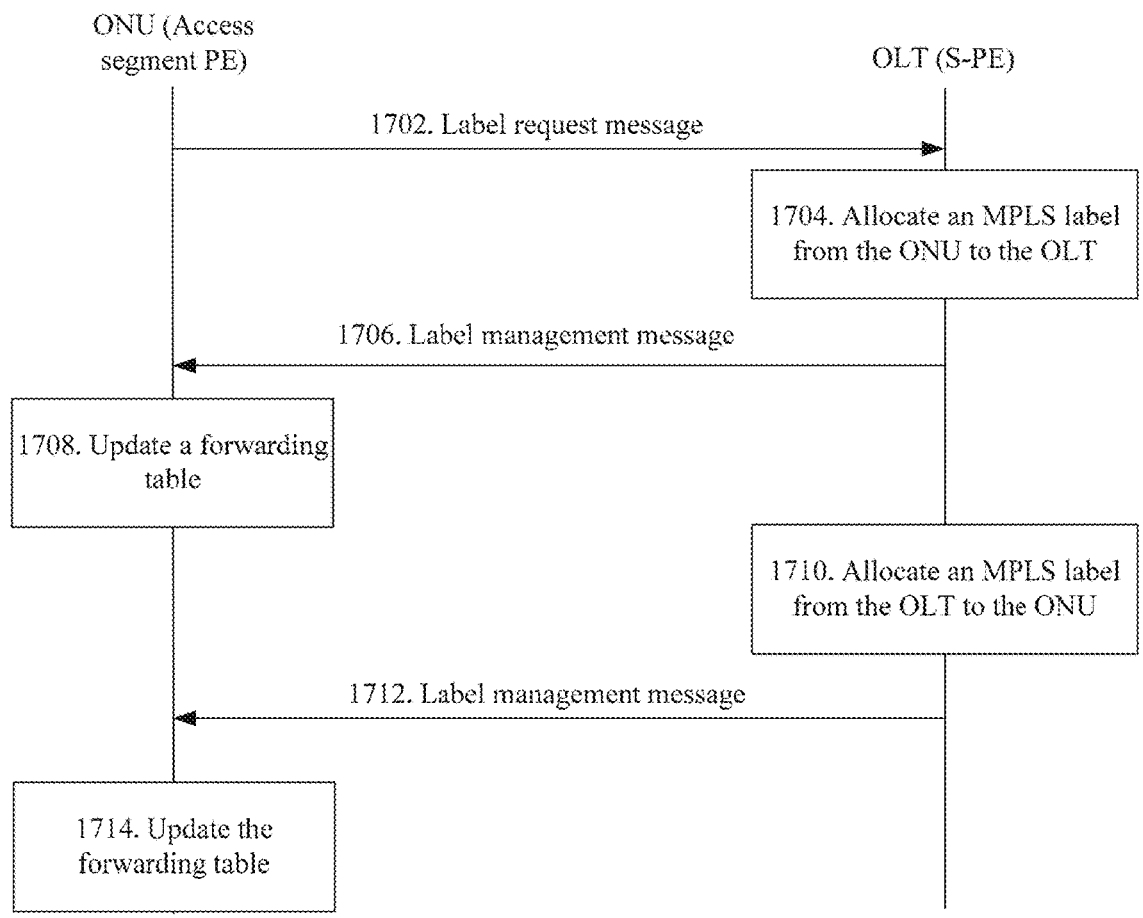
FIG. 17 is a schematic diagram of a method for managing an MPLS label of a PON in another specific application scenario according to an embodiment of the present invention.

FIG. 17 is a schematic diagram of a method for managing an MPLS label of a PON in another specific application scenario according to an embodiment of the present invention. In this application scenario, an S-PE device is an OLT. The method includes:

Step 1702: An ONU sends a label request message to an OLT. A protocol of the label request message may be an OMCI protocol, an Ethernet OAM protocol, L2CP, a TR069 protocol, or an AAA protocol. The label request message may carry egress node information to indicate a direction. For example, the egress node information is the OLT, that is, an MPLS label from the ONU to the OLT is requested to be allocated. When the OLT takes the initiative to perform label allocation, Step 1702 may be omitted.

Step 1704: The OLT allocates one MPLS label or a set of MPLS labels from the ONU to the OLT for an MPLS tunnel ID 1.

Step 1706: The OLT sends a label management message to the ONU. A protocol of the label management message may be the OMCI protocol, the Ethernet OAM protocol, L2CP, the TR069 protocol, or the AAA protocol. The label management message carries the MPLS tunnel ID 1 and the corresponding MPLS label from the ONU to the OLT.

Step 1708: The ONU updates a forwarding table according to the MPLS tunnel ID 1 and the MPLS label from the ONU to the OLT.

Step 1710: The OLT allocates one MPLS label or a set of MPLS labels from the OLT to the ONU for an MPLS tunnel ID 2.

Step 1712: The OLT sends a label management message to the ONU. A protocol of the label management message may be the OMCI protocol, the Ethernet OAM protocol, L2CP, the TR069 protocol, or the AAA protocol. The label management message carries the MPLS tunnel ID 2 and the MPLS label from the OLT to the ONU.

Step 1714: The ONU updates the forwarding table according to the MPLS tunnel ID 2 and the MPLS label from the OLT to the ONU.

Still another specific application scenario of the embodiment of the present invention is described below with reference to FIG. 18.

Figure 18:
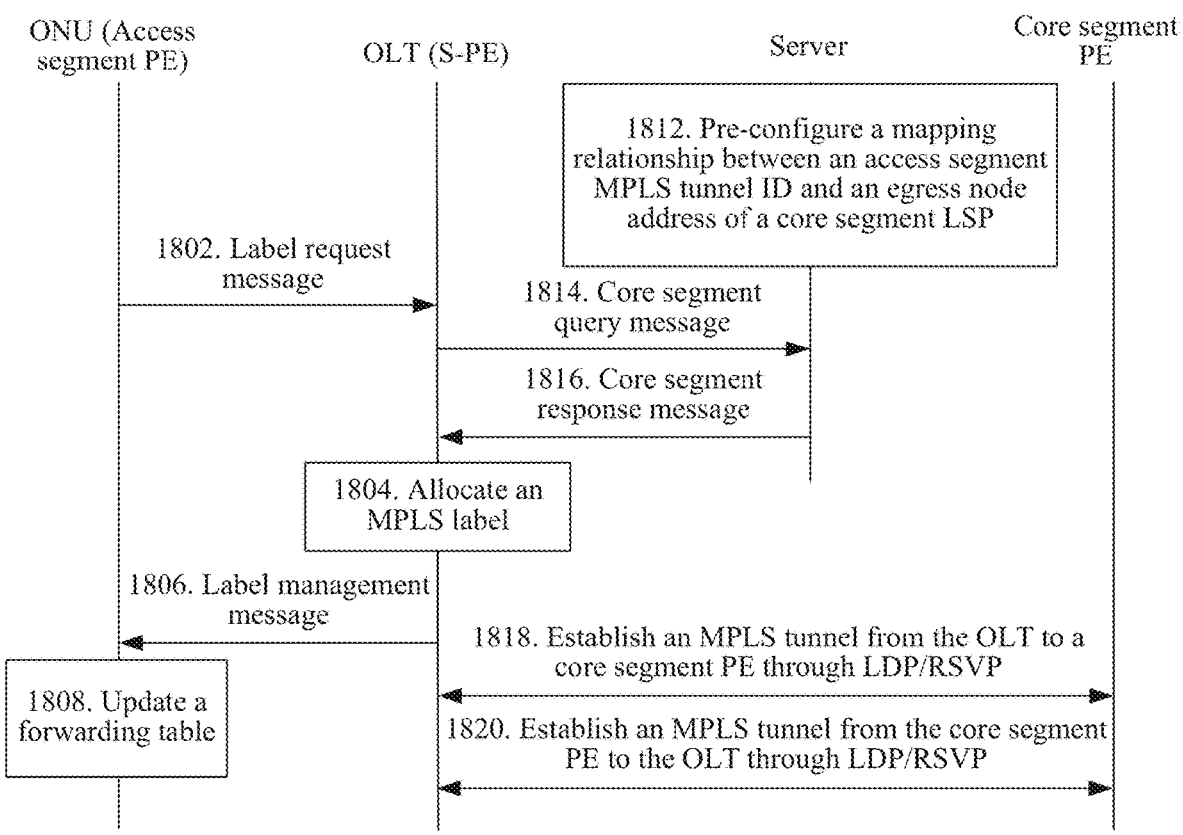
FIG. 18 is a schematic diagram of a method for managing an MPLS label of a PON in still another specific application scenario according to an embodiment of the present invention.

FIG. 18 is a schematic diagram of a method for managing an MPLS label of a PON in still another specific application scenario according to an embodiment of the present invention. In this application scenario, an S-PE device is an OLT. The method includes:

Step 1802: An ONU sends a label request message to an OLT. A protocol of the label request message may be an OMCI protocol, an Ethernet OAM protocol, L2CP, a TR069 protocol, or an AAA protocol. The label request message carries one MPLS tunnel ID or a set of MPLS tunnel IDs to request allocation of one MPLS label or a set of MPLS labels corresponding to the MPLS tunnel ID. When the OLT takes the initiative to perform label allocation, Step 1802 may be omitted.

Step 1804: The OLT allocates one MPLS label or a set of MPLS labels for the MPLS tunnel ID.

Step 1806: The OLT sends a label management message to the ONU. A protocol of the label management message may be the OMCI protocol, the Ethernet OAM protocol, L2CP, the TR069 protocol, or the AAA protocol. The label management message carries the MPLS tunnel ID and the corresponding MPLS label. If the MPLS tunnel is unidirectional, an MPLS label from the ONU to the OLT corresponding to an MPLS tunnel ID 1 and an MPLS label from the OLT to the ONU corresponding to an MPLS tunnel ID 2 are allocated.

Step 1808: The ONU updates a forwarding table according to the MPLS tunnel ID and the MPLS label.

Step 1812: Pre-configure a mapping relationship between an access segment MPLS tunnel ID and an egress node address of a core segment LSP. The egress node address is usually a PE device address.

Step 1814: The OLT sends a core segment query message to a server, in which the core segment query message carries the MPLS tunnel ID.

Step 1816: The server sends a core segment response message to the OLT, in which the core segment response message carries a corresponding core segment PE device address that is queried and found according to the MPLS tunnel ID.

Step 1818: Establish an MPLS tunnel from the OLT to a core segment PE through LDP/RSVP according to the queried and found corresponding core segment PE device address.

Step 1820: Establish an MPLS tunnel from the core segment PE to the OLT through LDP/RSVP according to the queried and found corresponding core segment PE device address.

In Steps 1814 to 1816, the OLT simultaneously queries, on the server (for example, an AAA server or a policy server), configuration information of an LSP of a core segment in two directions (a direction from the ONU to the OLT of an access segment and a direction from the OLT to the ONU of the access segment) interconnected to an LSP of the access segment in two directions (the direction from the ONU to the OLT of the access segment and the direction from the OLT to the ONU of the access segment), for example, an egress node address of the core segment LSP and/or a policy or a profile that corresponds to the access segment MPLS tunnel ID, according to the access segment MPLS tunnel ID.

The query message and the response message in FIG. 18 may adopt an Access Request message and an Access Accept message of a RADIUS protocol, or adopt a protocol such as a Diameter protocol or a COPS protocol. The response message carries the egress node address of the core segment LSP, for example, an address of an egress node PE 1 of an LSP from the OLT to PE 1 of the core segment and an address of an egress node OLT of an LSP from PE 1 to the OLT of the core segment.

It should be understood by persons of ordinary skill in the art that Steps 1802 to 1808 relate to allocation of an access segment MPLS label, and Steps 1812 to 1820 relate to allocation of a core segment MPLS label. The allocation of the access segment MPLS label and the allocation of the core segment MPLS label are independent of each other, and FIG. 18 shows only a possible sequence.

When the allocation of the core segment MPLS label is performed before the allocation of the access segment MPLS label, the allocation of the access segment MPLS label may be triggered by the allocation of the core segment MPLS label, and in this case the allocation of the PW label of the access segment PW does not need to be triggered by the label request message. For the specific process, refer to FIG. 27.

Figure 27:
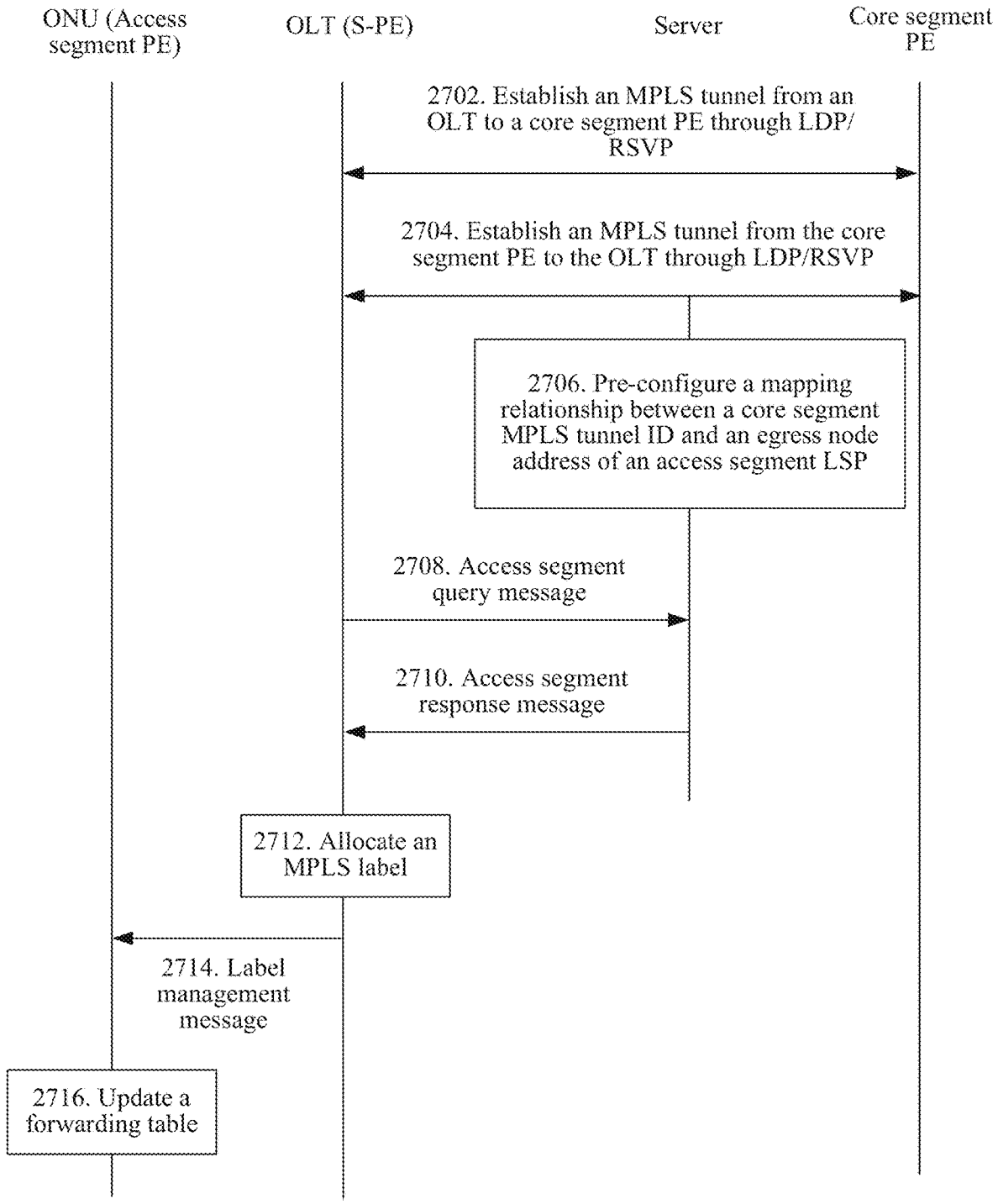
FIG. 27 is a schematic diagram of a method for managing an MPLS label of a PON in a specific application scenario according to an embodiment of the present invention, in which an S-PE device is an OLT in the application scenario.

FIG. 27 is a schematic diagram of a method for managing an MPLS label of a PON in a specific application scenario according to an embodiment of the present invention. In this application scenario, an S-PE device is an OLT. The method includes:

Step 2702: Establish an MPLS tunnel from an OLT to a core segment PE through LDP or RSVP.

Step 2704: Establish an MPLS tunnel from the core segment PE to the OLT through LDP or RSVP.

Step 2706: Pre-configured a mapping relationship between a core segment MPLS tunnel ID and an egress node address of an access segment LSP. The egress node address is usually a PE device address.

Step 2708: Establishment of a core segment MPLS tunnel triggers the OLT to send a core segment query message to a server, in which the core segment query message carries the core segment MPLS tunnel ID.

Step 2710: The server sends an access segment response message to the OLT, in which the access segment response message carries an address of a corresponding access segment PE device (for example, an ONU) queried and found according to the MPLS tunnel ID, and/or an access segment MPLS tunnel ID.

In Steps 2708 to 2710, the OLT queries, on the server (for example, an AAA server or a policy server), configuration information of an LSP of an access segment in two directions (a direction from the ONU to the OLT of the access segment and a direction from the OLT to the ONU of the access segment) interconnected to an LSP of a core segment in two directions, for example, an egress node address of the access segment LSP and/or the access segment MPLS tunnel ID, according to the core segment MPLS tunnel ID. When the server and the OLT co-exist, Steps 2708 to 2710 may be simplified so that the address of the access segment PE device (for example, the ONU) corresponding to the MPLS tunnel ID is acquired within the device.

Step 2712: The establishment of the core segment MPLS tunnel triggers establishment of an access segment MPLS tunnel. The OLT allocates one MPLS label or a set of MPLS labels for the access segment MPLS tunnel ID.

Step 2714: The OLT sends a label management message to the ONU. A protocol of the label management message may be an OMCI protocol, an Ethernet OAM protocol, L2CP, a TR069 protocol, or an AAA protocol. The label management message carries the access segment MPLS tunnel ID and the corresponding MPLS label. If the MPLS tunnel is unidirectional, an MPLS label from the ONU to the OLT corresponding to an access segment MPLS tunnel ID 1 and an MPLS label from the OLT to the ONU corresponding to an access segment MPLS tunnel ID 2 are allocated.

Step 2716: The ONU updates a forwarding table according to the MPLS tunnel ID and the MPLS label.

Another specific application scenario of the embodiment of the present invention is described below with reference to FIG. 19, in which an access segment and a core segment are separated by an S-PE.

Figure 19:
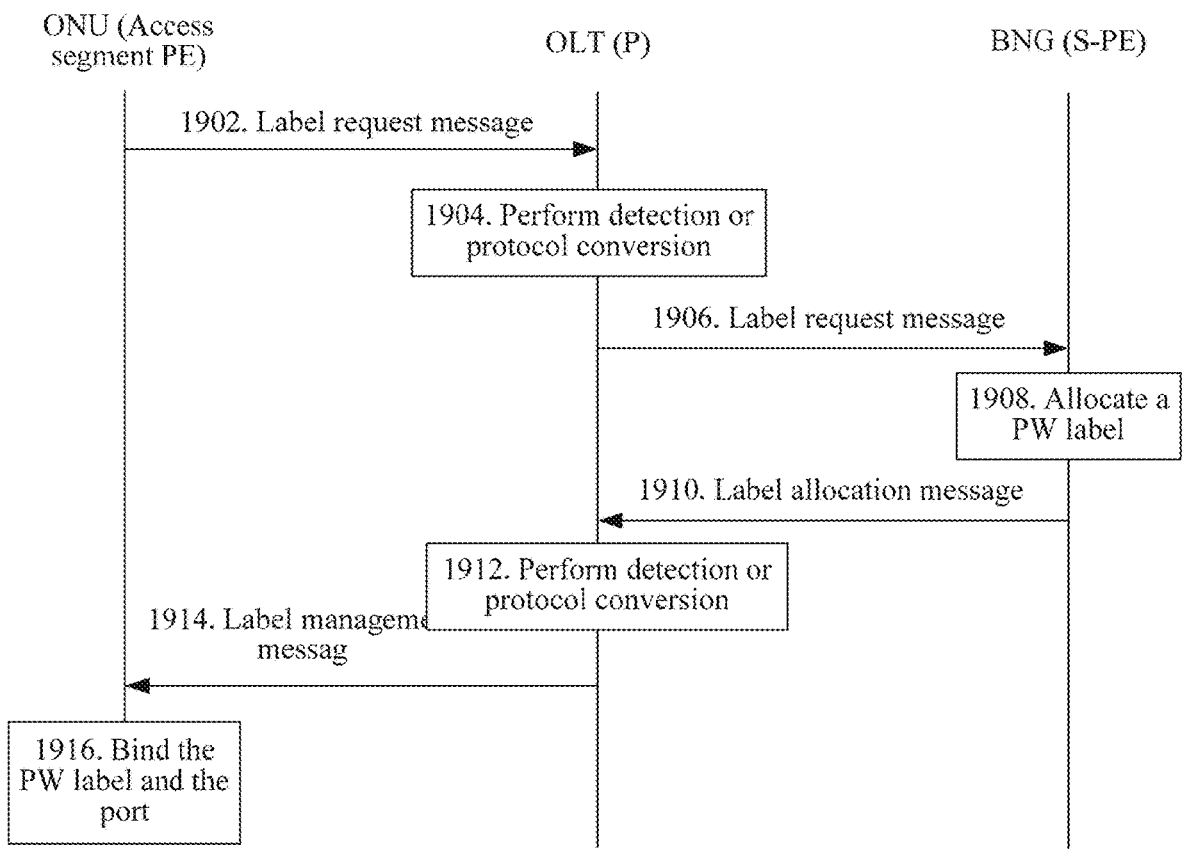
FIG. 19 is a schematic diagram of a method for managing a PW label of a PON in another specific application scenario according to an embodiment of the present invention.

FIG. 19 is a schematic diagram of a method for managing a PW label of a PON in another specific application scenario according to an embodiment of the present invention. In this application scenario, a BNG is an S-PE device. A specific application scenario in which an IP edge node or a metropolitan area convergence node is an S-PE device is basically the same as the specific application scenario shown in FIG. 19. Taking a port being an ONU port as an example, the method includes:

Step 1902: An ONU sends a label request message to an OLT. A protocol of the label request message may be an OMCI protocol, an Ethernet OAM protocol, L2CP, a TR069 protocol, or an AAA protocol. The label request message carries an ONU port.

Step 1904: When the protocol of the label request message is the OMCI protocol or the Ethernet OAM protocol, the OLT forwards the label request message to a BNG after converting the protocol of the label request message into L2CP, the TR069 protocol, or the AAA protocol. Optionally, the OLT detects the label request message, and adds an OLT port to the label request message.

Step 1906: The OLT forwards the label request message to the BNG.

When the BNG takes the initiative to perform label allocation, Steps 1902 to 1906 may be omitted.

Step 1908: The BNG allocates one corresponding PW label or a set of corresponding PW labels for one AC or a set of ACs identified by the ONU port and the OLT port. If the PW label is unidirectional, a PW label from the ONU to the BNG and a PW label from the BNG to the ONU that correspond to the port are allocated.

Step 1910: The BNG sends a label management message to the OLT. A protocol of the label management message may be L2CP, the TR069 protocol, or the AAA protocol. The label management message carries the ONU port, the OLT port, and the corresponding PW label.

Step 1912: After detecting the label management message, the OLT directly forwards the label management message to the ONU, and the OLT may also forward the label management message to the ONU after deleting the OLT port in the label management message. Alternatively, the OLT forwards the label management message to the ONU after converting the protocol of the label management message into the OMCI protocol or the Ethernet OAM protocol.

Step 1914: The OLT forwards the label management message to the ONU.

Step 1916: The ONU updates a forwarding table according to the ONU port and the PW label. The updating the forwarding table specifically includes associating the PW label with the ONU port.

Still another specific application scenario of the embodiment of the present invention is described below with reference to FIG. 20.

Figure 20:
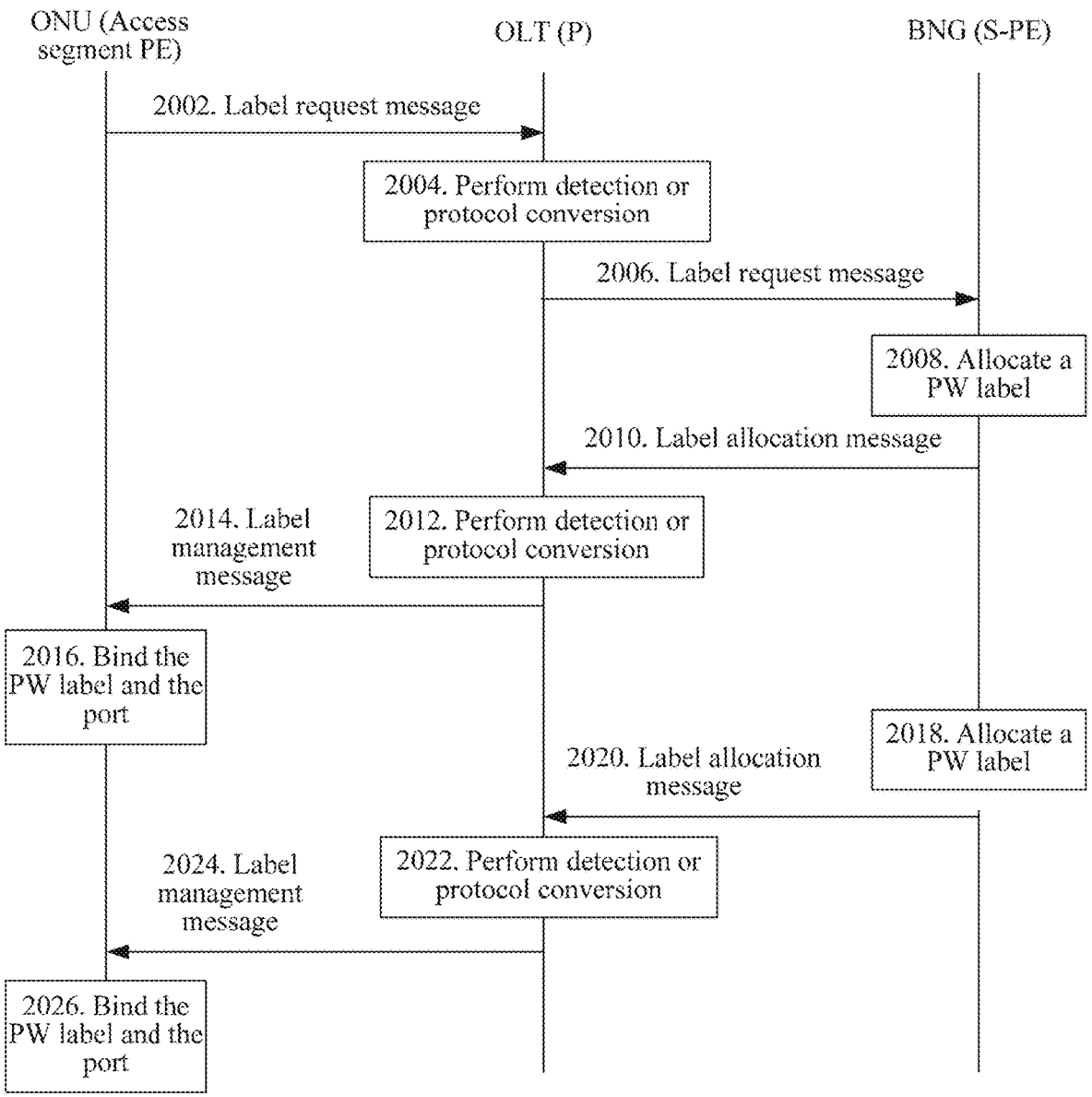
FIG. 20 is a schematic diagram of a method for managing a PW label of a PON in still another specific application scenario according to an embodiment of the present invention.

FIG. 20 is a schematic diagram of a method for managing a PW label of a PON in still another specific application scenario according to an embodiment of the present invention. In this application scenario, a BNG is an S-PE device. A specific application scenario in which an IP edge node or a metropolitan area convergence node is an S-PE device is basically the same as the specific application scenario shown in FIG. 20. The method includes:

Step 2002: An ONU sends a label request message to an OLT. A protocol of the label request message may be an OMCI protocol, an Ethernet OAM protocol, L2CP, a TR069 protocol, or an AAA protocol. The label request message carries an ONU port and egress node information (indicating a direction). For example, the egress node information is a BNG address, that is, a PW label from the ONU to the BNG is requested to be allocated.

Step 2004: When the protocol of the label request message is the OMCI protocol or the Ethernet OAM protocol, the OLT forwards the label request message to a BNG after converting the protocol of the label request message into L2CP, the TR069 protocol, or the AAA protocol. Optionally, the OLT detects the label request message, and adds an OLT port to the label request message.

Step 2006: The OLT forwards the label request message to the BNG.

When the BNG takes the initiative to perform allocation, Steps 2002 to 2006 may be omitted.

Step 2008: The BNG allocates one PW label or a set of PW labels from the ONU to the BNG for the ONU port and the OLT port.

Step 2010: The BNG sends a label management message to the OLT. A protocol of the label management message may be L2CP, the TR069 protocol, or the AAA protocol. The label management message carries the ONU port, the OLT port, and the corresponding PW label from the ONU to the BNG.

Step 2012: After detecting the label management message, the OLT directly forwards the label management message to the ONU, and the OLT may also forward the label management message to the ONU after deleting the OLT port in the label management message. Alternatively, the OLT forwards the label management message to the ONU after converting the protocol of the label management message into the OMCI protocol or the Ethernet OAM protocol.

Step 2014: The OLT forwards the label management message to the ONU.

Step 2016: The ONU updates a forwarding table according to the ONU port and the PW label from the ONU to the BNG. The updating the forwarding table specifically includes associating the PW label with the ONU port.

Step 2018: The BNG allocates one PW label or a set of PW labels from the BNG to the ONU for the ONU port and the OLT port.

Step 2020: The BNG sends a label management message to the OLT. A protocol of the label management message may be L2CP, the TR069 protocol, or the AAA protocol. The label management message carries the ONU port, the OLT port, and the corresponding PW label from the BNG to the ONU.

Step 2022: After detecting the label management message, the OLT directly forwards the label management message to the ONU, and the OLT may also forward the label management message to the ONU after deleting the OLT port in the label management message. Alternatively, the OLT forwards the label management message to the ONU after converting the protocol of the label management message into the OMCI protocol or the Ethernet OAM protocol.

Step 2024: The OLT forwards the label management message to the ONU.

Step 2026: The ONU updates the forwarding table according to the ONU port and the PW label from the BNG to the ONU. The updating the forwarding table specifically includes associating the PW label with the ONU port.

Another specific application scenario of the embodiment of the present invention is described below with reference to FIG. 21.

Figure 21:
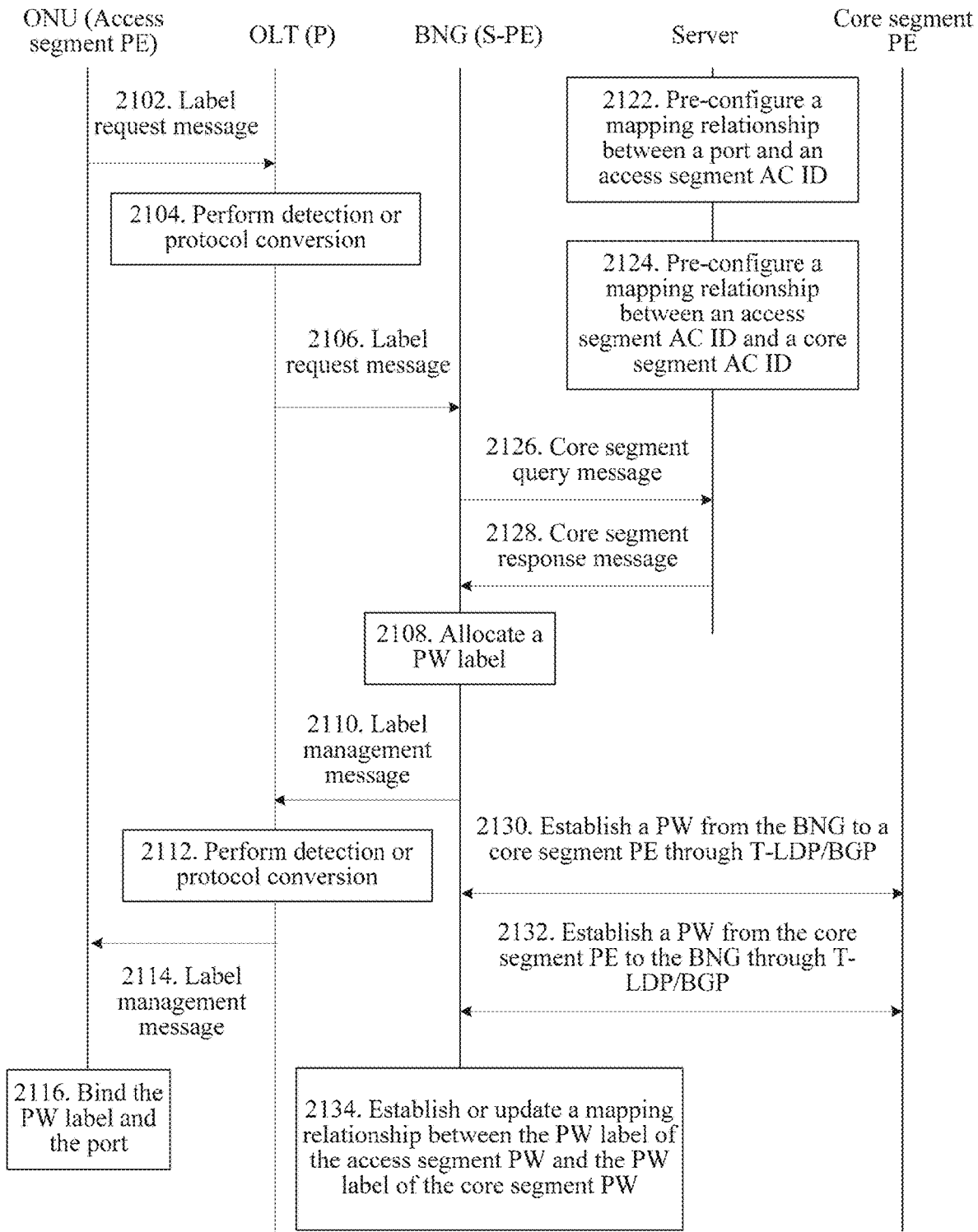
FIG. 21 is a schematic diagram of a method for managing a PW label of a PON in another specific application scenario according to an embodiment of the present invention.

FIG. 21 is a schematic diagram of a method for managing a PW label of a PON in another specific application scenario according to an embodiment of the present invention. In this application scenario, a BNG is an S-PE device. A specific application scenario in which an IP edge node or a metropolitan area convergence node is an S-PE device is basically the same as the specific application scenario shown in FIG. 21. The method includes:

Step 2102: An ONU sends a label request message to an OLT. A protocol of the label request message may be an OMCI protocol, an Ethernet OAM protocol, L2CP, a TR069 protocol, or an AAA protocol. The label request message carries an ONU port.

Step 2104: When the protocol of the label request message is the OMCI protocol or the Ethernet OAM protocol, the OLT forwards the label request message to a BNG after converting the protocol of the label request message into L2CP, the TR069 protocol, or the AAA protocol. Optionally, the OLT detects the label request message, and adds an OLT port to the label request message.

Step 2106: The OLT forwards the label request message to the BNG.

When the BNG takes the initiative to perform allocation, Steps 2102 to 2106 may be omitted.

Step 2108: The BNG allocates a PW label for the ONU port and the OLT port.

Step 2110: After detecting the label management message, the OLT directly forwards the label management message to the ONU. Optionally, the OLT forwards the label management message to the ONU after deleting the OLT port in the label management message. Alternatively, the OLT forwards the label management message to the ONU after converting the protocol of the label management message into the OMCI protocol or the Ethernet OAM protocol.

Step 2112: After detecting the label management message, the OLT directly forwards the label management message to the ONU, and the OLT may also forward the label management message to the ONU after deleting the OLT port in the label management message. Alternatively, the OLT forwards the label management message to the ONU after converting the protocol of the label management message into the OMCI protocol or the Ethernet OAM protocol.

Step 2114: The OLT forwards the label management message to the ONU.

Step 2116: The ONU updates a forwarding table according to the ONU port and the PW label. The updating the forwarding table specifically includes associating the PW label with the ONU port.

Step 2122: A server pre-configures a mapping relationship between an AC ID and a port. If the AC ID is just port information rather than a logic number of the port information, Step 2122 may be omitted.

Step 2124: If the AC ID is a logic number of the "port" information, pre-configured, in the server, a mapping relationship between an access segment AC ID and a core segment AC ID. If the AC ID is just the "port" information, directly pre-configured, in the server, a mapping relationship between the core segment AC ID and access segment "port" information.

Step 2126: The BNG sends a core segment query message to the server, in which the core segment query message carries the OLT port and the ONU port.

Step 2128: The server sends a core segment response message to the BNG, in which the core segment response message carries a corresponding core segment PE device address and a corresponding core segment AC ID that are queried and found according to the OLT port and the ONU port.

Step 2130: Establish a PW from the BNG to a core segment PE through T-LDP/BGP according to the core segment PE device address and the core segment AC ID, and allocate a PW label of the PW.

Step 2132: Establish a PW from the core segment PE to the BNG through T-LDP/BGP according to the core segment PE device address and the core segment AC ID, and allocate a PW label of the PW.

Step 2134: The OLT establishes or updates a mapping relationship between a PW label of an access segment PW and a PW label of a core segment PW.

It should be understood by persons of ordinary skill in the art that Steps 2102 to 2116 relate to allocation of the PW label of the access segment PW, and Steps 2122 to 2132 relate to allocation of the PW label of the core segment PW. The allocation of the PW label of the access segment PW and the allocation of the PW label of the core segment PW are independent of each other, and FIG. 21 shows only a possible sequence.

Still another specific application scenario of the embodiment of the present invention is described below with reference to FIG. 22.

Figure 22:
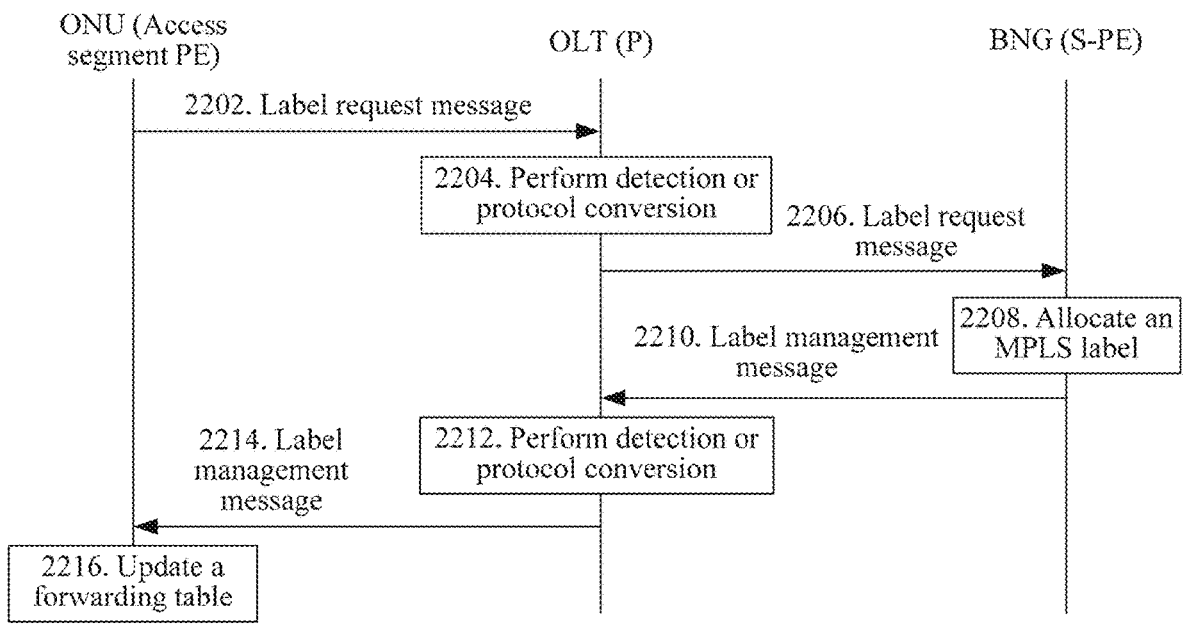
FIG. 22 is a schematic diagram of a method for managing an MPLS label of a PON in still another specific application scenario according to an embodiment of the present invention.

FIG. 22 is a schematic diagram of a method for managing an MPLS label of a PON in still another specific application scenario according to an embodiment of the present invention. In this application scenario, a BNG is an S-PE device. A specific application scenario in which an IP edge node or a metropolitan area convergence node is an S-PE device is basically the same as the specific application scenario shown in FIG. 22. The method includes:

Step 2202: An ONU sends a label request message to an OLT. A protocol of the label request message may be an OMCI protocol, an Ethernet OAM protocol, L2CP, a TR069 protocol, or an AAA protocol. The label request message carries one MPLS tunnel ID or a set of MPLS tunnel IDs to request allocation of one MPLS label or a set of MPLS labels corresponding to the MPLS tunnel ID.

Step 2204: When the protocol of the label request message is the OMCI protocol or the Ethernet OAM protocol, the OLT forwards the label request message to a BNG after converting the protocol of the label request message into L2CP, the TR069 protocol, or the AAA protocol. Optionally, the OLT detects the label request message, and adds an OLT port to the label request message.

Step 2206: The OLT forwards the label request message to the BNG.

When the BNG takes the initiative to perform label allocation, Steps 2202 to 2206 may be omitted.

Step 2208: The BNG allocates one MPLS label or a set of MPLS labels for the MPLS tunnel ID. The MPLS label includes an MPLS label between the BNG and the OLT and an MPLS label between the OLT and the ONU.

Step 2210: The BNG sends a label management message to the OLT. A protocol of the label management message may be L2CP, the TR069 protocol, or the AAA protocol. The label management message carries the MPLS tunnel ID and the corresponding MPLS label.

Step 2212: After detecting the label management message, the OLT acquires the MPLS label between the BNG and the OLT, and updates a corresponding label switching table. The OLT directly forwards the label management message to the ONU, or the OLT may forward the label management message to the ONU after deleting the OLT port in the label management message, or forward the label management message to the ONU after converting the protocol of the label management message into the OMCI protocol or the Ethernet OAM protocol. When forwarding the label management message, the OLT may delete the MPLS label between the BNG and the OLT in the label management message.

Step 2214: The OLT forwards the label management message to the ONU.

Step 2216: The ONU updates a forwarding table according to the MPLS tunnel ID and the MPLS label.

Another specific application scenario of the embodiment of the present invention is described below with reference to FIG. 23.

Figure 23:
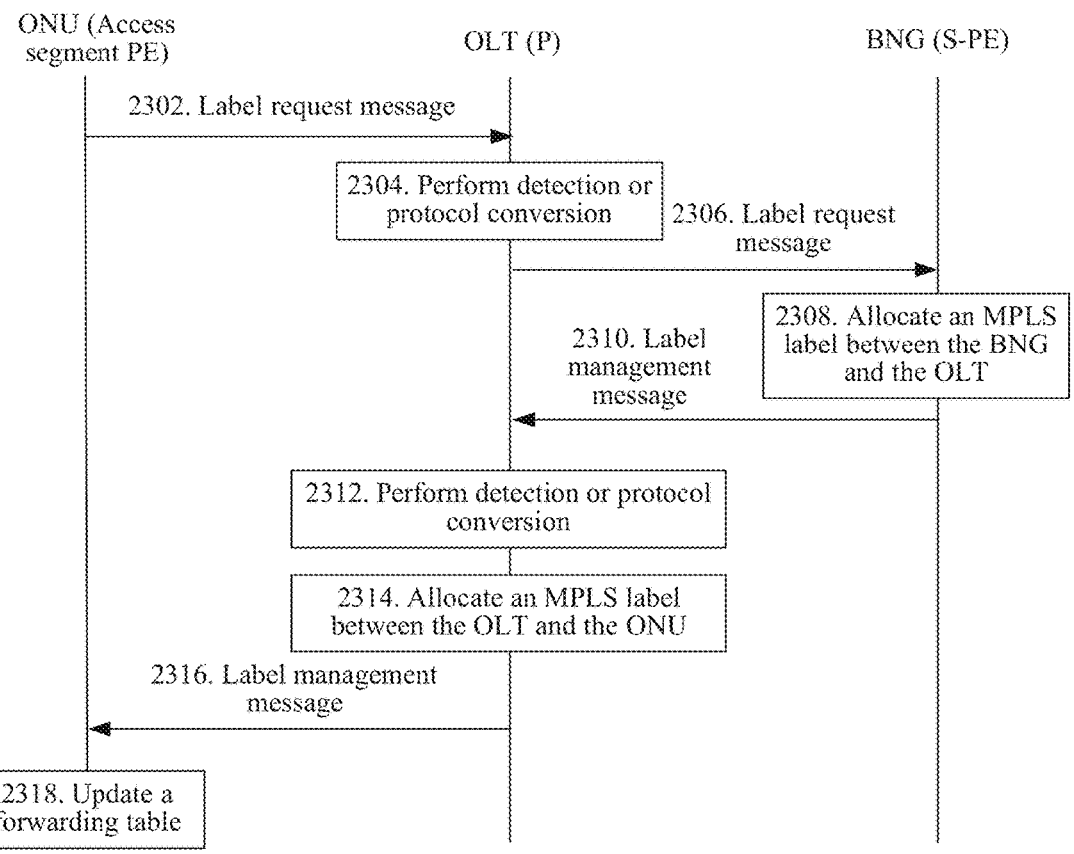
FIG. 23 is a schematic diagram of a method for managing an MPLS label of a PON in another specific application scenario according to an embodiment of the present invention.

FIG. 23 is a schematic diagram of a method for managing an MPLS label of a PON in another specific application scenario according to an embodiment of the present invention. In this application scenario, a BNG is an S-PE device. A specific application scenario in which an IP edge node or a metropolitan area convergence node is an S-PE device is basically the same as the specific application scenario shown in FIG. 23. The method includes:

Step 2302: An ONU sends a label request message to an OLT. A protocol of the label request message may be an OMCI protocol, an Ethernet OAM protocol, L2CP, a TR069 protocol, or an AAA protocol. The label request message carries one MPLS tunnel ID or a set of MPLS tunnel IDs.

Step 2304: When the protocol of the label request message is the OMCI protocol or the Ethernet OAM protocol, the OLT forwards the label request message to a BNG after converting the protocol of the label request message into L2CP, the TR069 protocol, or the AAA protocol. Optionally, the OLT detects the label request message, and adds an OLT port to the label request message.

Step 2306: The OLT forwards the label request message to the BNG.

When the BNG takes the initiative to perform label allocation, Steps 2302 to 2306 may be omitted.

Step 2308: The BNG allocates an MPLS label between the BNG and the OLT for the MPLS tunnel ID.

Step 2310: The BNG sends a label management message to the OLT. A protocol of the label management message may be L2CP, the TR069 protocol, or the AAA protocol. The label management message carries the MPLS tunnel ID and the MPLS label.

Step 2312: After detecting the label management message, the OLT acquires the MPLS label between the BNG and the OLT, and updates a corresponding label switching table. The OLT directly forwards the label management message to the ONU, or the OLT may forward the label management message to the ONU after deleting the OLT port in the label management message, or forward the label management message to the ONU after converting the protocol of the label management message into the OMCI protocol or the Ethernet OAM protocol.

Step 2314: The OLT allocates an MPLS label between the OLT and the ONU, and replaces the MPLS label between the BNG and the OLT in the label management message with the MPLS label between the OLT and the ONU.

Step 2316: The OLT forwards the label management message to the ONU.

Step 2318: The ONU updates a forwarding table according to the MPLS tunnel ID and the MPLS label.

Still another specific application scenario of the embodiment of the present invention is described below with reference to FIG. 24.

Figure 24:
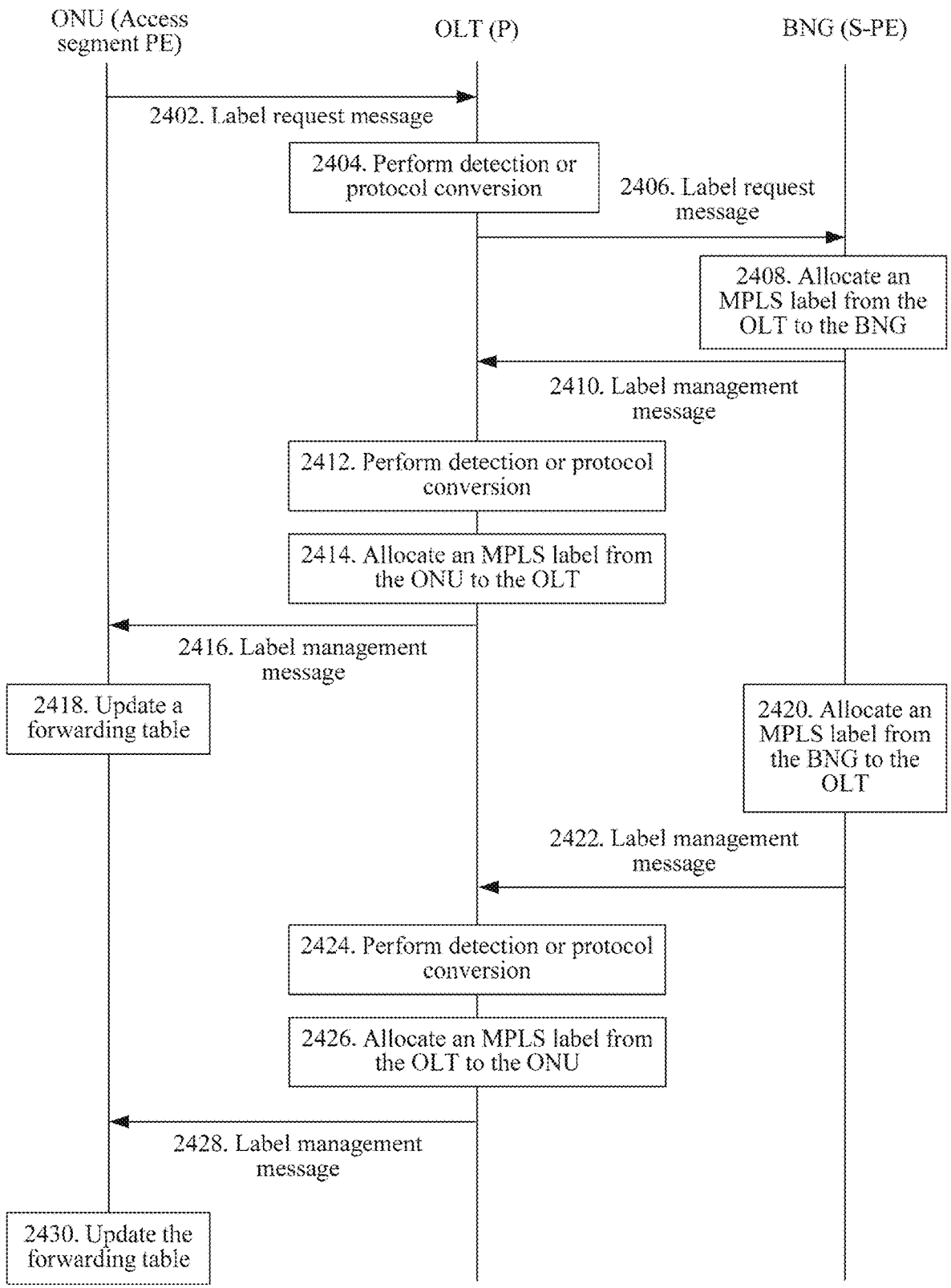
FIG. 24 is a schematic diagram of a method for managing an MPLS label of a PON in still another specific application scenario according to an embodiment of the present invention.

FIG. 24 is a schematic diagram of a method for managing an MPLS label of a PON in still another specific application scenario according to an embodiment of the present invention. In this application scenario, a BNG is an S-PE device. A specific application scenario in which an IP edge node or a metropolitan area convergence node is an S-PE device is basically the same as the specific application scenario shown in FIG. 24. The method includes:

Step 2402: An ONU sends a label request message to an OLT. A protocol of the label request message may be an OMCI protocol, an Ethernet OAM protocol, L2CP, a TR069 protocol, or an AAA protocol. The label request message carries egress node information (indicating a direction). For example, the egress node information is a BNG address, that is, an MPLS label from the ONU to a BNG is requested to be allocated.

Step 2404: When the protocol of the label request message is the OMCI protocol or the Ethernet OAM protocol, the OLT forwards the label request message to the BNG after converting the protocol of the label request message into L2CP, the TR069 protocol, or the AAA protocol. Optionally, the OLT detects the label request message, and adds an OLT port to the label request message.

Step 2406: The OLT forwards the label request message to the BNG.

When the BNG takes the initiative to perform label allocation, Steps 2402 to 2406 may be omitted.

Step 2408: The BNG allocates an MPLS label from the OLT to the BNG for an MPLS tunnel ID 1.

Step 2410: The BNG sends a label management message to the OLT. A protocol of the label management message may be L2CP, the TR069 protocol, or the AAA protocol. The label management message carries the MPLS tunnel ID 1 and the MPLS label from the OLT to the BNG.

Step 2412: After detecting the label management message, the OLT acquires the MPLS label from the OLT to the BNG, and updates a corresponding label switching table. The OLT directly forwards the label management message to the ONU, or the OLT may forward the label management message to the ONU after deleting the OLT port in the label management message, or forward the label management message to the ONU after converting the protocol of the label management message into the OMCI protocol or the Ethernet OAM protocol.

Step 2414: The OLT allocates an MPLS label from the ONU to the OLT, and replaces the MPLS label from the OLT to the BNG in the label management message with the MPLS label from the ONU to the OLT.

Step 2416: The OLT forwards the label management message to the ONU.

Step 2418: The ONU updates a forwarding table according to the MPLS tunnel ID 1 and the MPLS label.

Step 2420: The BNG allocates an MPLS label from the BNG to the OLT for an MPLS tunnel ID 2.

Step 2422: The BNG sends a label management message to the OLT. A protocol of the label management message may be L2CP, the TR069 protocol, or the AAA protocol. The label management message carries the MPLS tunnel ID 2 and the MPLS label from the BNG to the OLT.

Step 2424: After detecting the label management message, the OLT acquires the MPLS label from the BNG to the OLT, and updates a corresponding label switching table. The OLT directly forwards the label management message to the ONU, or the OLT may forward the label management message to the ONU after deleting the OLT port in the label management message, or forward the label management message to the ONU after converting the protocol of the label management message into the OMCI protocol or the Ethernet OAM protocol.

Step 2426: The OLT allocates an MPLS label from the OLT to the ONU, and replaces the MPLS label from the BNG to the OLT in the label management message with the MPLS label from the ONU to the OLT.

Step 2428: The OLT forwards the label management message to the ONU.

Step 2430: The ONU updates the forwarding table according to the MPLS tunnel ID 2 and the MPLS label.

Another specific application scenario of the embodiment of the present invention is described below with reference to FIG. 25.

Figure 25:
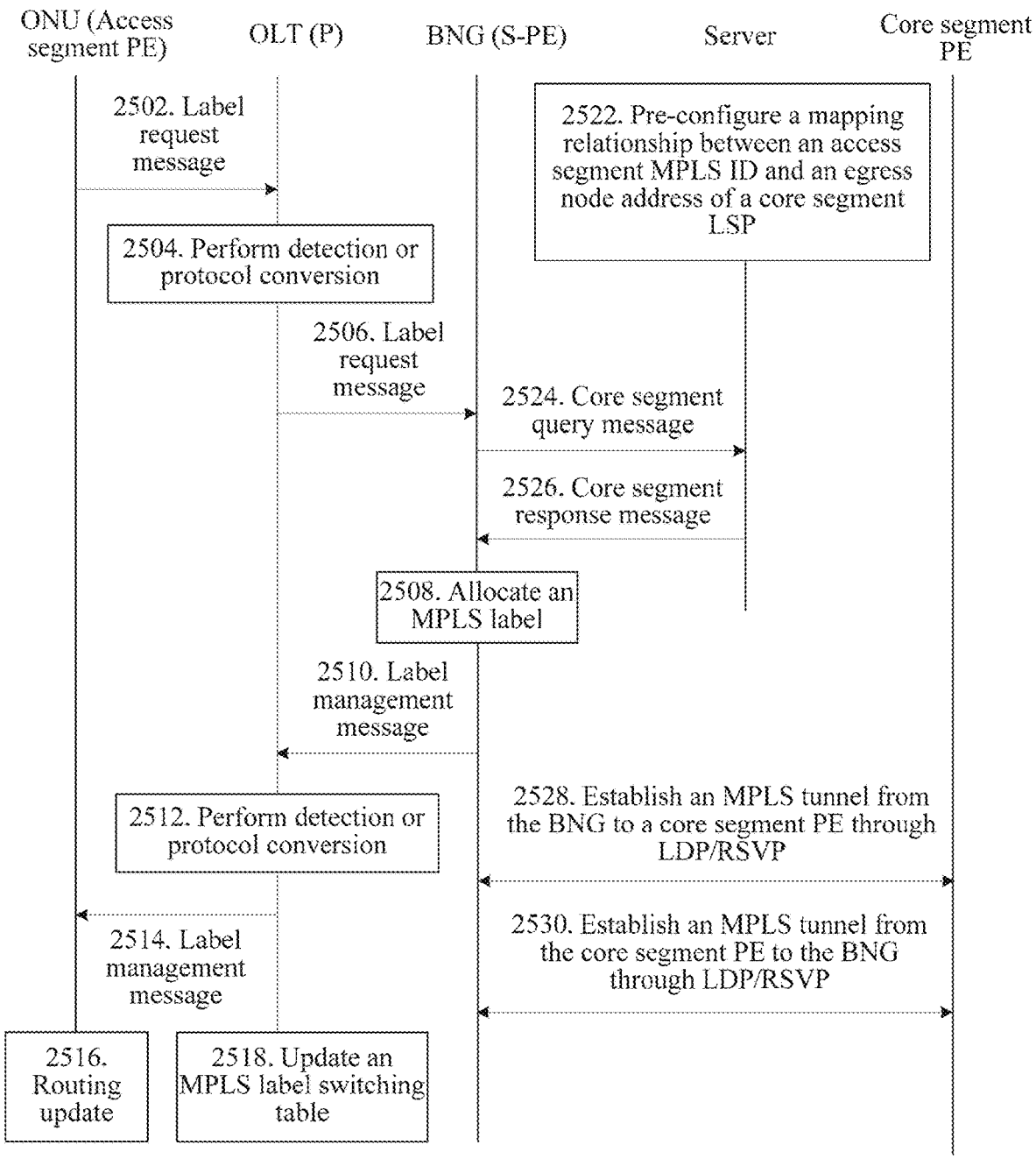
FIG. 25 is a schematic diagram of a method for managing an MPLS label of a PON in another specific application scenario according to an embodiment of the present invention.

FIG. 25 is a schematic diagram of a method for managing an MPLS label of a PON in another specific application scenario according to an embodiment of the present invention. In this application scenario, a BNG is an S-PE device. A specific application scenario in which an IP edge node or a metropolitan area convergence node is an S-PE device is basically the same as the specific application scenario shown in FIG. 25. The method includes:

Step 2502: An ONU sends a label request message to an OLT. A protocol of the label request message may be an OMCI protocol, an Ethernet OAM protocol, L2CP, a TR069 protocol, or an AAA protocol. The label request message carries an MPLS tunnel ID.

Step 2504: When the protocol of the label request message is the OMCI protocol or the Ethernet OAM protocol, the OLT forwards the label request message to a BNG after converting the protocol of the label request message into L2CP, the TR069 protocol, or the AAA protocol. Optionally, the OLT detects the label request message, and adds an OLT port to the label request message.

Step 2506: The OLT forwards the label request message to the BNG.

When the BNG takes the initiative to perform label allocation, Steps 2502 to 2506 may be omitted.

Step 2508: The BNG allocates an MPLS label for the MPLS tunnel ID. If the label is unidirectional, the MPLS label includes an MPLS label between the BNG and the OLT and an MPLS label between the OLT and the ONU.

Step 2510: The BNG sends a label management message to the OLT. A protocol of the label management message may be L2CP, the TR069 protocol, or the AAA protocol. The label management message carries the MPLS tunnel ID and the MPLS label.

Step 2512: After detecting the label management message, the OLT directly forwards the label management message to the ONU, or the OLT may forward the label management message to the ONU after deleting the OLT port in the label management message, or forward the label management message to the ONU after converting the protocol of the label management message into the OMCI protocol or the Ethernet OAM protocol.

Step 2514: The OLT forwards the label management message to the ONU.

Step 2516: The ONU updates a forwarding table according to the MPLS tunnel ID and the MPLS label.

Step 2518: The OLT updates a label switching table according to the MPLS tunnel ID and the MPLS label, in which the label switching table may be an LFIB.

Step 2522: Pre-configured a mapping relationship between an access segment MPLS tunnel ID and an egress node address of a core segment LSP. The egress node address is usually a PE device address.

Step 2524: The BNG sends a core segment query message to a server, in which the core segment query message carries the MPLS tunnel ID.

Step 2526: The server sends a core segment response message to the BNG, in which the core segment response message carries a corresponding core segment PE device address that is queried and found according to the MPLS tunnel ID.

Step 2528: Establish an MPLS tunnel from the BNG to a core segment PE through LDP/RSVP according to the queried and found corresponding core segment PE device address.

Step 2530: Establish an MPLS tunnel from the core segment PE to the BNG through LDP/RSVP according to the queried and found corresponding core segment PE device address.

In the technical solutions according to this embodiment, a message of the access network management protocol is used to carry a label, so a problem of supporting PWE3 on a data plane of an access segment of an access network under the conditions that device complexity of an access device is not increased and a configuration of the access device needs only to be slightly changed.

It should be understood by persons of ordinary skill in the art that all or a part of the steps of the methods according to the foregoing embodiments may be implemented by a program instructing relevant hardware. The program may be stored in a computer readable storage medium, such as a Read Only Memory/Random Access Memory (ROM/RAM), a magnetic disk or a Compact Disk-Read Only Memory (CD-ROM).

The foregoing descriptions are merely embodiments of the present invention, but are not intended to limit the protection scope of the present invention. Any modification, equivalent replacement, or improvement made without departing from the principle of the present invention should fall within the protection scope of the present invention.

What is claimed is:

1. A method for managing a label of an access network, comprising:
    determining, by a first device, a label of an access segment Pseudo Wire (PW) for a first user-side port of a second device having at least two ports, wherein the second device is a user-side device of the first device, and a user-side end of the access segment PW is the second device;
    establishing a corresponding relationship between an identifier of the first user-side port of the at least two ports and the label;
    carrying the corresponding relationship between the identifier of the first user-side port of the at least two ports and the label in a message;
    sending the message to the second device; and
    receiving a frame from the second device that is encapsulated with the label.

2. The method according to claim 1, wherein the method further comprises:
    sending a core segment query message to a server, wherein the core segment query message carries the identifier of the first user-side port;
    receiving a core segment response message sent by the server, wherein the core segment response message carries a core segment Provider Edge (PE) device address and a core segment Attachment Circuit (AC) identifier that correspond to the first user-side port;
    establishing a core segment PW to a core segment PE device according to the core segment PE device address and the core segment AC identifier;
    determining a label of the core segment PW; and
    storing, by the first device a mapping relationship between the label of the core segment PW and the label of the access segment PW.

3. The method according to claim 1, wherein before determining the label of the access segment PW for the first user-side port, the method further comprises:
    establishing, by the first device, a core segment PW to a core segment Provider Edge (PE) device;
    determining a PW label of the core segment PW;
    acquiring, by the first device, at least one of a first access segment port and a second access segment port corresponding to one of the PW label of the core segment PW and a core segment Attachment Circuit (AC) identifier of the core segment PW, wherein the first access segment port is a port of the second device and the second access segment port is a port of the first device;
    acquiring a second device address corresponding to one of the label of the core segment PW and the core segment AC identifier of the core segment PW; and
    storing, by the first device, a mapping relationship between the label of the core segment PW and the label of the access segment PW after sending the message to the second device.

4. The method according to claim 3, wherein the acquiring operation further comprises:
    sending, by the first device, an access segment query message to a server, wherein the access segment query message carries one of the PW label of the core segment PW and the core segment AC identifier of the core segment PW; and
    receiving, by the first device, an access segment response message sent by the server, wherein the access segment response message carries the at least one of the first access segment port and second access segment port corresponding to the one of the PW label of the core segment PW and the core segment AC identifier of the core segment PW, and address corresponding to the PW label of the core segment PW or the core segment AC identifier of the core segment PW.

5. The method according to claim 1, wherein before sending the message to the ONU, the method further comprises:
    receiving, by the first device, a label request message before determining the label, wherein the label request message carries the identifier of the first user-side port.

6. The method according to claim 1, further comprising:
    modifying, by the first device, the label of the access segment PW for the first user-side port, and modifying the corresponding relationship between the identifier of the first user-side port and the PW label, wherein the label of the access segment PW is a PW label.

7. The method according to claim 1, wherein the access segment PW is based on Multiple Protocol Label Switching (MPLS).

8. A non-transitory computer readable medium including computer-executable instructions, when the computer-executable instructions are executed by a first device, for:
    determining a label of an access segment Pseudo Wire PW for a first user-side port of a second device having at least two ports, wherein the second device is a user-side device of the first device, and a user-side end of the access segment PW is the second device;
    establishing a corresponding relationship between an identifier of the first user-side port of the at least two ports and the label;
    carrying the corresponding relationship between the identifier of the first user-side port of the at least two ports and the label in a message;
    sending the message to the second device; and
    receiving a frame from the second device, wherein the frame is encapsulated with the label.

9. The computer readable medium according to claim 8, further comprising computer-executable instructions for:
    sending a core segment query message to a server, wherein the core segment query message carries the first user-side port and a port of the first device;
    receiving a core segment response message sent by the server, the core segment response message carries a core segment Provider Edge (PE) device address and a core segment Attachment Circuit (AC) identifier that correspond to the first user-side port and a port of the first device;
    establishing a core segment PW to a core segment PE device according to the core segment PE device address and the core segment AC identifier;
    determining a PW label of the core segment PW; and modifying a mapping relationship between the PW label of the core segment PW and the label of the access segment PW, wherein the label of the access segment PW is a PW label.

10. The non-transitory computer readable medium of claim 8, wherein the access segment PW is based on Multiple Protocol Label Switching (MPLS).

11. A non-transitory computer readable medium including computer-executable instructions when the computer-executable instructions are executed by a second device, for:
sending a label request to a first device, wherein the label request carries an identifier of a user-side port of the second device;
receiving a response comprising a correspondence between the identifier of the user-side port and a label of an access segment Pseudo Wire (PW), wherein the second device is a user-side device of the first device, and a user-side end of the access segment PW is the second device;
obtaining a data frame encapsulated with the label; and
sending the frame to the OLT.

12. A method for managing a label, comprising:
sending, by a second device, a label request to a first device, wherein the label request carries an identifier of a user-side port of the second device;
receiving by the second device, a response comprising a correspondence between the identifier of the user-side port and a label of an access segment Pseudo Wire (PW), wherein the second device is a user-side device of the first device, and a user-side end of the access segment PW is the second device;
obtaining a data frame encapsulated with the label; and
sending, by the second device, the frame to the first device.

13. The method according to claim 1, wherein the first device is an Optical Line Terminal (OLT), the second device is an Optical Network Unit (ONU), and the label of the access segment PW is a PW label or a MPLS label.

14. The non-transitory computer readable medium according to claim 8, wherein the first device is an Optical Line Terminal (OLT), the second device is an Optical Network Unit (ONU), and the label of the access segment PW is a PW label or a MPLS label.

15. The non-transitory computer readable medium according to claim 11, wherein the first device is an Optical Line Terminal (OLT), the second device is an Optical Network Unit (ONU), and the label is a PW label of an access segment PW or a MPLS label of an access segment PW.

16. The method according to claim 12, wherein the first device is an Optical Line Terminal (OLT), the second device is an Optical Network Unit (ONU), and the label is a PW label of an access segment PW or a MPLS label of an access segment PW.

17. A system comprising:
a first device; and
a second device,
the first device being configured to:
determine a label of an access segment PW for a first user-side port of the second device having at least two ports;
establish a corresponding relationship between an identifier of the first user-side port of the at least two ports and the label;
carry the corresponding relationship between the identifier of the first user-side port of the at least two ports and the label in a message;
sending the message comprising the corresponding relationship to the second device; and
receive a frame from the second device, wherein the frame is encapsulated with the label;
the second device being configured to:
send a label request to the first device, wherein the label request carries an identifier of the user-side port of the second device;
receive the message comprising the corresponding relationship;
obtain the frame encapsulated with the label based on the corresponding relationship; and
send the frame to the first device.

18. The system according to claim 17, wherein the first device is an Optical Line Terminal (OLT), the second device is an Optical Network Unit (ONU), and the label of the access segment PW is a PW label or a MPLS label.

19. The method according to claim 1, wherein the first user-side port of the second device is coupled with a user device via Attachment Circuit (AC), Passive Optical Network (PON), Digital Subscriber Line (DSL) or Ethernet.

20. The non-transitory computer readable medium according to claim 8, wherein the first user-side port of the second device is coupled with a user device via Attachment Circuit (AC), Passive Optical Network (PON), Digital Subscriber Line (DSL) or Ethernet.

21. The non-transitory computer readable medium according to claim 11, wherein the first user-side port of the second device is coupled with a user device via Attachment Circuit (AC), Passive Optical Network (PON), Digital Subscriber Line (DSL) or Ethernet.

* * * * *